United States Patent
Foo et al.

(10) Patent No.: US 12,167,480 B2
(45) Date of Patent: Dec. 10, 2024

(54) PROXIMITY BASED PERSONALIZATION OF A COMPUTING DEVICE

(71) Applicant: Apple Inc., Cupertino, CA (US)

(72) Inventors: Jeremy Jie You Foo, San Jose, CA (US); Niharika M. Bedekar, Saratoga, CA (US); Joel J. Angelone, San Francisco, CA (US); David S. Clark, San Jose, CA (US); Parry Panesar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 17/242,644

(22) Filed: Apr. 28, 2021

(65) Prior Publication Data

US 2021/0378038 A1    Dec. 2, 2021

Related U.S. Application Data

(60) Provisional application No. 63/032,882, filed on Jun. 1, 2020.

(51) Int. Cl.
*H04W 76/14*    (2018.01)
*G06F 21/10*    (2013.01)
*H04L 67/306*    (2022.01)

(52) U.S. Cl.
CPC ............ *H04W 76/14* (2018.02); *G06F 21/10* (2013.01); *H04L 67/306* (2013.01)

(58) Field of Classification Search
CPC .............................. H04W 76/14; H04L 67/306
USPC ........................................................ 370/310
See application file for complete search history.

(56) References Cited

U.S. PATENT DOCUMENTS

| 10,757,216 B1* | 8/2020 | Van Vliet ................ H04L 67/52 |
| 2012/0210364 A1 | 8/2012 | Lee et al. |
| 2015/0121413 A1* | 4/2015 | Ramakrishnan .... G06F 16/9577 725/62 |
| 2016/0127777 A1 | 5/2016 | Roberts et al. |
| 2018/0337924 A1 | 11/2018 | Graham et al. |
| 2018/0367843 A1* | 12/2018 | Han ................. H04N 21/41407 |
| 2020/0120094 A1 | 4/2020 | Jain et al. |
| 2020/0374324 A1* | 11/2020 | Le Strat ................... H04N 7/15 |
| 2021/0185520 A1* | 6/2021 | Hassan ................. G06V 40/12 |
| 2022/0207128 A1* | 6/2022 | Sen ......................... H04L 67/12 |

FOREIGN PATENT DOCUMENTS

| CN | 108882158 A | 11/2018 |
| GB | 201904894 | 5/2019 |
| WO | 2019/045639 A1 | 3/2019 |

* cited by examiner

*Primary Examiner* — Alan S Chou
(74) *Attorney, Agent, or Firm* — Invoke

(57) ABSTRACT

In some implementations, a computing device can be configured for users (e.g., user devices) that are detected nearby the computing device. For example, the computing device may be a communal device configured for a single user but generally used by multiple users. The communal device can discover when a known (e.g., authorized, trusted, etc.) user device is near the communal device and obtain personalization data from the nearby user device. The communal device can configure the communal device based on the personalization data to personalize an activity hosted by the communal device for the user of the nearby user device. To protect the user's personalization data, the communal device can delete the user's personalization data when the activity hosted by the communal device is terminated.

21 Claims, 18 Drawing Sheets

PROXIMITY BASED PERSONALIZATION OF A COMPUTING DEVICE

RELATED APPLICATIONS

This application claims the benefit of the filing U.S. Provisional Patent Application No. 63/032,882 filed on Jun. 1, 2020, which is hereby incorporated by reference.

TECHNICAL FIELD

The disclosure generally relates to configuring a computing device for specific users.

BACKGROUND

Many modern homes include communal computing devices and personal computing devices. The communal computing devices (e.g., a media streaming device, set top box, etc.) may be used by several different people within the home, while the personal computing devices (e.g., wearable devices, phones, etc.) may be used by a single user. The personal computing devices may have features and/or data (e.g., sensors, private personal information, user behavioral data, etc.) that the communal computing device may not have. However, in some cases a particular user may wish to temporarily use the communal computing device to provide a personalized service to the user. In such cases, it can be burdensome to the user to manually and/or temporarily configure the communal computing device for the user's personal use.

SUMMARY

In some implementations, a computing device can be configured for users (e.g., user devices) that are detected nearby the computing device. For example, the computing device may be a communal device configured for a single user but generally used by multiple users. The communal device can discover when a known (e.g., authorized, trusted, etc.) user device is near the communal device and obtain personalization data from the nearby user device. The communal device can configure the communal device based on the personalization data to personalize an activity hosted by the communal device for the user of the nearby user device. To protect the user's personalization data, the communal device can delete the user's personalization data when the activity hosted by the communal device is terminated.

Particular implementations provide at least the following advantages. A user can have a personalized experience while interacting with a communal device used by multiple different users. A user can have a personalized experience while interacting with a communal device that is associated with a user account that is different than the user's user account. A user is not burdened with manually configuring, or providing input to, the communal device to cause the communal device to provide a personalized user experience. The user's privacy can be protected by deleting the user's personalization data from the communal device when the activity in which the user (e.g., user device) is participating is terminated.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
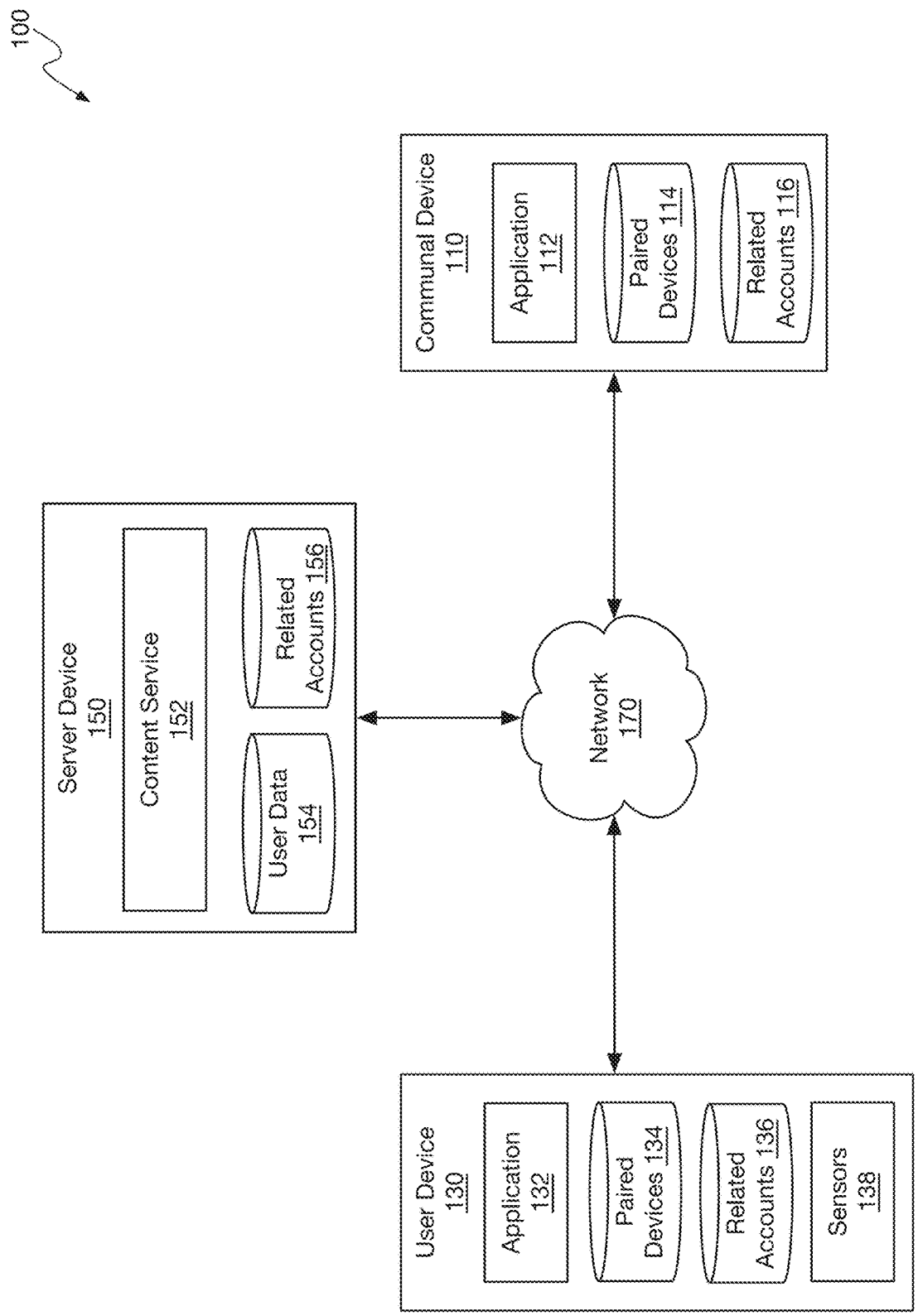
FIG. 1 is a block diagram of an example system for proximity-based personalization of a computing device.

FIG. 1 is a block diagram of an example system 100 for proximity-based personalization of a computing device. In some implementations, a communal computing device can be personalized for temporary, individual use based which user's, or user devices (e.g., as a proxy for a particular user), are nearby the communal computing device. For example, the communal computing device can detect personal computing devices (e.g., user devices) within a threshold distance of the communal computing device and receive personalization data from the nearby personal computing devices. The communal computing device can then (e.g., temporarily) configure the communal computing device to provide a personalized experience for the user of the personal computing device.

In some implementations, a personal computing device can be configured to share a user's private personal information with communal computing device. For example, the user of the personal computing device can authorize the personal computing device to share user identification, user personalization data (e.g., user preferences), user activity data (e.g., sensor data, behavior data, etc.), etc., with the communal computing device for the purposes of temporarily personalizing the communal computing device for the user for the duration of an activity enabled by the communal computing device. For example, a communal audio/video streaming device (e.g., set top box, smart television, etc.) may provide a home exercise service (e.g., software application) that a user can interact with to perform a workout at home. The communal streaming device can detect when the user's personal computing device (e.g., a smartwatch) is near the communal streaming device and request personalization data from the user's personal computing device. Upon receipt of the personalization data, the communal streaming device can configure the communal streaming device and/or the home exercise service using the personalization data. As the workout program is presented by the communal streaming device, the user's personal computing device can monitor the user's activity (e.g., using various sensors on the personal computing device) and send activity data to the communal computing device. The communal computing device can adjust the presentation of the workout program hosted by the communal computing device based on the activity data received from the user's personal computing device. Upon termination of the workout, the communal computing device can delete the user's personalization data and/or user's activity data from the communal computing device so that other users who use the communal computing device cannot access the first user's personal information.

In various embodiments, the communal computing device can automatically select a personal computing device (e.g., as proxy for a user or users) for participation in an activity hosted, presented, etc., by the communal computing device based on the personal computing device's proximity to the communal computing device. The communal computing device can receive user personalization data (e.g., user configuration data, user preference data, user activity data, etc.) from a personal computing device and use the personalization data to make content suggestions (e.g., movie suggestions, music suggestions, workout suggestions, etc.) associated with the activity. The communal computing device can receive user personalization data (e.g., user configuration data, user preference data, user activity data, etc.) from a personal computing device and use the personalization data to automatically select and/or present content based on the received user personalization data. The communal computing device can personalize the communal computing device based on the personalization data associated with multiple users so that the multiple users can enjoy a shared personalized experience.

In some implementations, system 100 can include communal device 110. For example, communal computing device 110 can be a streaming media device, set top box, smart speaker, or other computing device, usually an entertainment device, that is generally left unlocked and open for use by multiple, different users. While the communal computing device may be configured with a specific user account that allows the communal computing device access to data and services (e.g., internet services, cloud service, streaming media services, etc.) associated with the user account, the communal computing device is generally configured to allow anyone to interact with the communal computing device and utilize the services it provides. For example, communal device 110 can be a computing device that is configured for use with a particular user account but is left unlocked (e.g., not secured with a password) so that other users can interact with communal device 110 to view various types of content. Communal device 110 can be a set-top-box that streams content from a content service and presents the content on a television or other display device. Communal device 110 can be used by anyone who has physical access to the input device (e.g., remote control device) associated with communal device 110, for example. In some embodiments, communal device 110 can be a smart speaker, smart television, set-top-box, plug-in media streamer, or any other type of computing device.

In some implementations, communal device 110 can include application 112. For example, application 112 can be any type of software application configured to present content to a user of communal device 110. Specific examples of application 112 include a home exercise application that presents personalized workout videos based on personalization data received from a personal user device, a music application that plays personalized music selections based on personalization data received from a personal user device, a video application that presents personalized movie and/or video selections based on personalization data, and/or any other type of application that may be configured to personalize content for the user.

In some implementations, communal device 110 can include paired devices database 114. For example, paired device database 114 can store data identifying user devices that have previously been paired with communal device 110. A user device may be paired with communal device 110 so that the user device and the communal device 110 can exchange data, stream content, receive and transmit user input, or perform other operations. Paired device database 114 can store for each paired user device a unique pairing token, a device identifier, and/or other pairing data as may be described herein below. In some implementations, user devices that have been previously paired with communal device 110 can reconnect to communal device 110 without having to go through a manual pairing process (e.g., without requiring user input to cause the devices to become paired). Communal device 110 can use the pairing data in pairing database 114 to identify known user devices and allow the known user device to establish a communication channel with communal device 110.

In some implementations, communal device 110 can include related accounts database 116. For example, a family of users who each have their own user account may wish to share purchased media, subscriptions, or other services. A family of users may wish to share access to communal devices within the home environment. To do so, the user accounts associated with each family member can be identified or configured as a related account that is to be given access to the shared family services and/or devices. The related user account data can be shared or synchronized among the user devices associated with the related user accounts. As described above, communal device 110, while generally an open device shared amongst multiple users, may be configured for a particular user account to allow the communal computing device 110 to access various network services without requiring a user to provide their credentials every time a user (e.g., any user) wishes to use communal device 110. This particular user account may be associated with other related accounts (e.g., accounts associated with family members or others living within the same household). Communal device 110 can obtain data identifying the related user accounts and the devices associated with these related accounts (e.g., from server 150) and store the related user account data (e.g., user account identifiers, user identifiers, user device identifiers associated with the user accounts, etc.) in related accounts database 116. Communal device 110 can use the related user account data in related accounts database 116 to identify known user devices and allow the known user device (e.g., previously paired user device, related user device, etc.) to establish a communication channel with communal device 110.

In some implementations, system 100 can include user device 130. While only one user device 130 is depicted in system 100 for simplicity and clarity, system 100 can include multiple user devices 130 associated with various users and corresponding user accounts. For example, user device 130 can be a personal computing device (e.g., smartphone, tablet computer, smartwatch, smart glasses, etc.) configured and secured for use by a single user. Because user device 130 is secured (e.g., by a passcode, facial recognition, fingerprinting, etc.) such that only an authorized user can access user device 130, user device 130 may be configured to collect, manage, and/or use a user's private, personal information. For example, since user device 130 is a secured device, user device 130 may store user identifying information, user behavioral data, user activity data, sensor data related to user activities, financial information, and/or other user sensitive, personal information. This personal information can be used to provide a personalized user experience for the user of user device 130 on user device 130 and/or on communal computing device 110, as described further below.

In some implementations, user device 130 can include application 132. For example, application 132 can be any type of software application configured to present content to a user of user device 130. Specific examples of application 132 include a home exercise application that presents personalized workout videos based on personalization data received from a personal user device, a music application that plays personalized music selections based on personalization data received from a personal user device, a video application that presents personalized movie and/or video selections based on personalization data, and/or any other type of application that may be configured to personalize content for the user.

In some implementations, application 132 on user device 130 can be configured to communicate with application 112 on communal device 110 to coordinate and provide a personalized user experience on communal device 110. For example, application 132 can send personalized configuration data, real-time or near real-time user activity data, and/or other personalization data to application 112 on communal device 110 so that communal device 110 can personalize an activity hosted by communal device 110 for the user of user device 130, as may be described further herein below.

User device 130 and communal device 110 can communicate with each other through network 170. For example, network 170 can be a wide area network, local area network, the Internet, Wi-Fi network, an ad-hoc peer-to-peer network, a direct peer-to-peer Wi-Fi connection, a direct Bluetooth (e.g., Bluetooth, Bluetooth low energy, etc.) connection or any other inter-device communication network. In some implementations, two different network types may be used to communicate between user device 130 and communal device 110. For example, a direct peer-to-peer network connection can be used to establish an initial connection between user device 130 and communal device 110, while a local area network may be used to send content, user activity data, configuration data, and/or other information between user device 130 and communal device 110. In some implementations, a direct peer-to-peer network may be used for all communication between user device 130 and communal device 110. In some implementations, an indirect, routed network may be used for all communication between user device 130 and communal device 110.

In some implementations, user device 130 can include paired devices database 134. For example, paired device database 134 can store data identifying user devices that have previously been paired with user device 130. User device 130 may be paired with communal device 110 so that user device 130 and communal device 110 can exchange data, stream content, receive and transmit user input, or perform other operations. Paired device database 134 can store for each paired user device a unique pairing token, a device identifier, and/or other pairing data as may be described herein below. In some implementations, user devices (e.g., user device 130) that have been previously paired with communal device 110 can reconnect to communal device 110 without having to go through a manual pairing process (e.g., without requiring user input to cause the devices to become paired). User device 130 can use the pairing data in pairing database 134 to identify known computing devices, such as communal device 110, and allow the known computing device to establish a communication channel with user device 130.

In some implementations, user device 130 can include related accounts database 136. For example, a family of users who each have their own user account may wish to share purchased media, subscriptions, or other services. A family of users may wish to share access to communal devices (e.g., communal device 110) within the home environment. To do so, the user accounts associated with each family member can be identified or configured as a related account (e.g., belonging to a family group of accounts) that is to be given access to the shared family services and/or devices. The related user account data can be shared or synchronized among the user devices associated with the related user accounts. User device 130 can obtain data identifying the related user accounts and the devices associated with these related accounts (e.g., from server 150) and store the related user account data (e.g., user account identifiers, user identifiers, user device identifiers associated with the user accounts, etc.) in related accounts database 136. User device 130 can use the related user account data in related accounts database 116 to identify known computing devices and allow the known computing device (e.g., previously paired user device, related user device, etc.) to establish a communication channel with user device 130 without having to perform a manual pairing process with user device 130.

In some implementations, user device 130 can include sensors 138. For example, sensors 138 can include motion sensors, heartbeat sensors, proximity sensors, ambient light sensors, and/or any other type of sensor for measuring or detecting movement, user biometric data, location, and/or environmental conditions. In some implementations, application 132 can use the sensor data received from sensors 138 to identify and/or monitor user activity (e.g., exercise activity, general movement, engagement with an activity, etc.). Application 132 may send the user activity data to application 112 on communal device 110 so that application 112 can personalize the user's experience based on the user activity data and/or determine the amount of engagement the user has with the current activity hosted by application 112 on communal device 110.

In some implementations, system 100 can include server device 150. For example, server device 150 can be a networked computing device that hosts various services, databases, and/or other computing functions that can be accessed by user device 130 and/or communal device 110 through network 170 (e.g., a wide area network, the Internet, a local area network, etc.).

In some implementations, server device 150 can include service 152. For example, service 152 can be a content providing (e.g., content streaming) service that can stream content (e.g., audio content, video content, movies, music, etc.) to user devices (e.g., user device 130) and/or communal computing devices (e.g., communal device 110). For example, user device 130 and/or communal device 110 can be configured with respective user accounts (e.g., service subscription accounts) associated with service 152 that provides user device 130 and/or communal device 110 access to service 152. The user accounts can be configured in the operating system of user device 130 and/or communal device 110. The user accounts can be configured in application 112/132 of user device 130 and/or communal device 110. Application 132 (e.g., an operating system application, a user installed application, etc.) can use the configured user account information to access service 152 through network 170 to download and/or stream content from service 152 to present to the user of user device 130 and/or communal device 110.

In some implementations, server device 150 can include user data database 154. For example, user data database 154 can store user data corresponding to various users of system 100. User data database 154 can, for example, have a record for each user of system 100 that stores user personalization data, such as user specific configuration data, historical user behavioral data, user preferences, and/or other user data as may be described herein. A computing device (e.g., user device 130, communal device 110, etc.) that is configured for a particular user account may access the user personalization data stored in user data database 154 for the particular user account. Thus, if the computing device needs to restore user personalization data for the particular user account to the computing device, the computing device can obtain the user personalization data for the particular user account from user data database 154 on server device 150 through network 170.

In some implementations, server device 150 can include related accounts database 156. For example, related accounts database 156 can store data that associates user accounts groups of related user accounts (e.g., family accounts). For example, a user associated with a particular user account can identify (e.g., via a web user interface, application user interface, operating system user interface, etc.) other user accounts that are related to the particular user account (e.g., accounts associated with family members, accounts associated with housemates, etc.). The association between the particular user account and the other identified user accounts can be stored in an association record (e.g., family record) in related accounts database 156. For example, the association record can include identification of the related user accounts, identification for users associated with the related user accounts, and/or identification of the computing devices associated with each related user account. This related account information for a related group of user devices can be shared or synchronized with the computing devices (e.g., user device 140, communal device 110, etc.) associated with each user within a related group. Thus, if user device 130 and communal device 110 are configured with user accounts that are related in related accounts database 156, then user device 130 and communal device 110 will receive from server device 150 the same association record data (e.g., identification of the related user accounts, identification for users associated with the related user accounts, and/or identification of the computing devices) that is stored in related accounts database 156 for the related accounts group to which they belong. If user device 130 and communal device 110 are configured with user accounts that are not related in related accounts database 156, then user device 130 and communal device 110 may receive from server device 150 the different association record data (e.g., identification of the related user accounts, identification for users associated with the related user accounts, and/or identification of the computing devices) from related accounts database 156 for the different, respective related accounts groups to which they belong. This related account information can then be used by user device 130 and/or communal device 110 to identify or determine known devices that do not require a manual pairing process and/or unknown devices that require an additional manual pairing process, as described further below.

While FIG. 1 depicts a single server device 150, system 100 can include multiple server devices 150 that provide the same of different services within system 100. For example, service 152, user data database 154, and/or related accounts database 156 can be hosted by a single server device 150 or multiple server devices 152. Additionally, in a multi-server system 100, service 152, user data database 154, and/or related accounts database 156 may be hosted on different server devices 150 or in various combinations of distributions across multiple server devices 150.

Figure 2:
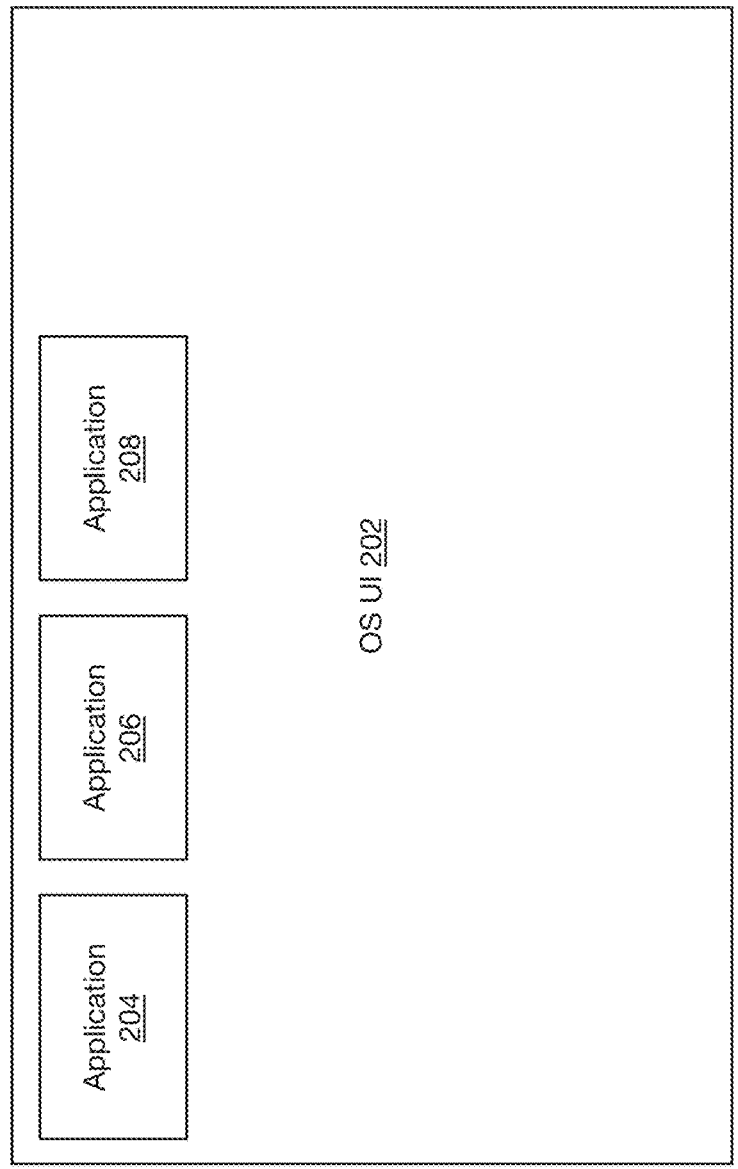
FIG. 2 is an illustration of an example communal device graphical user interface for initiating discovery of nearby user devices.

FIG. 2 is an illustration 200 of an example communal device graphical user interface for initiating discovery of nearby user devices. For example, graphical user interface (GUI) 202 can be presented by the operating system of communal device 110, described above. GUI 202 can be presented, for example, on a display (e.g., built-in display, external display, television, etc.) of communal device 110 upon startup of communal device 110 and/or when all applications of communal device 110 are terminated or minimized (e.g., running as background processes). GUI 202 may present graphical representations 204-208 of applications installed on communal device 110. A user may provide input selecting one of the graphical representations 204-208 to cause a corresponding application (e.g., application 112) to initiate discovery of nearby user devices (e.g., user device 130).

In some implementations, communal device 110 may not have a display device and, therefore, may not present GUI 202. For example, communal device 110 may be a smart speaker that does not have a display but, instead, may receive voice input commands to invoke an application (e.g., application 112) on communal device 110 and/or provide other input to communal device 110 and/or an application running on communal device 110.

In some implementations, communal device 110 may initiate discovery of nearby devices in response to a user selection of an application installed on communal device 110. For example, in response to the selection of an application representation 204-208, communal device 110 may execute (e.g., start, initiate, run, etc.) the corresponding application (e.g., application 112). During initialization, application 112 may cause communal device 110 to discover and/or detect nearby user devices that are capable of providing user personalization data.

In some implementations, communal device 110 may run a user device discovery process in anticipation of a user wishing to use application 112. For example, communal device 110 may periodically run a user device discovery process to monitor which user devices are nearby communal device 110 to reduce the latency or delay associated with discovery of nearby user devices when a user invokes application 112.

Figure 3:
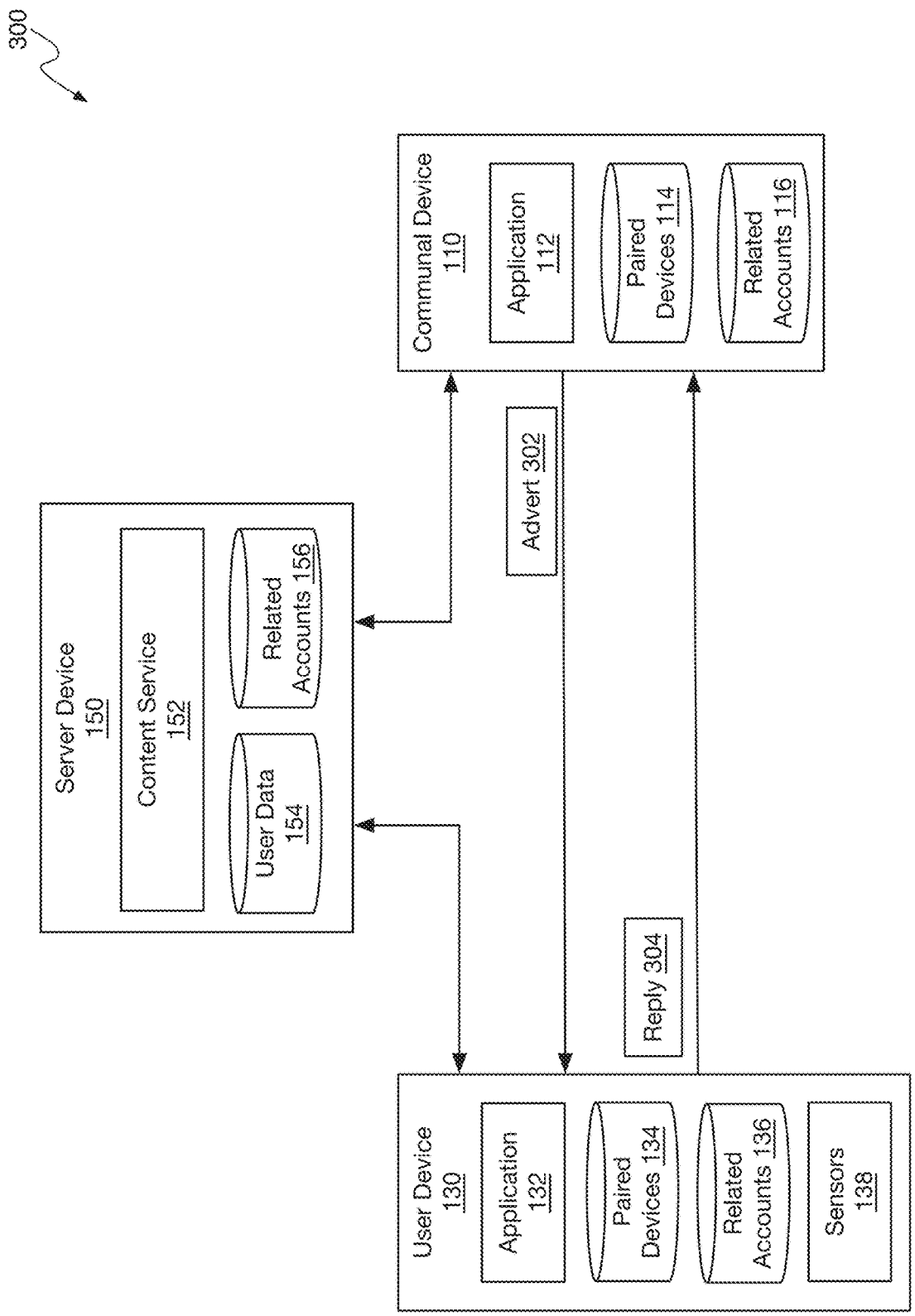
FIG. 3 is a block diagram of an example system for discovering nearby user devices.

FIG. 3 is a block diagram of an example system 300 for discovering nearby user devices. For example, system 300 can correspond to system 100 described above. System 300 can be configured to allow devices that "know" each other (e.g., previously paired devices, devices associated with related user accounts, previously authorized devices and/or user accounts, etc.) to automatically discover each other. For devices that do not know each other, system 300 can provide a manual pairing process, as described further below.

In some implementations, communal device 110 can broadcast advertisement 302 to determine which user devices are near communal device 110. For example, advertisement 302 can be broadcast using a short-range wireless communication (e.g., networking) technology, such as Bluetooth, Bluetooth LE, peer-to-peer Wi-Fi, or other wireless networking technology. In some implementations, advertisement 302 can be broadcast over a wired and/or wireless local area network (e.g., a home network, office network, etc.). Advertisement 302 can include information identifying communal device 110 (e.g., device identifier, MAC address, user account identifier associated with communal device 110, etc.). Advertisement 302 can include information identifying a service provided or requested by communal device 110. For example, when generating advertisement 302, communal device 110 can include information in the advertisement identifying an application that is providing or requesting a service to/from another device. When generating advertisement 302, communal device 110 can include information in the advertisement identifying a particular service provided by communal device 110 or needed from another device. For example, advertisement 302 can include information identifying application 112 and/or that application 112 needs or is looking for user devices (e.g., user device 130) that are capable of providing user personalization data for configuring application 112 and/or that are capable of user activity monitoring and providing real-time, or near real time, user activity data to application 112 and/or communal device 110.

In specific examples, advertisement 302 could indicate that application 112 is a workout application running on communal device 110 and that application 112 is looking for a user device to provide workout personalization data and/or real-time workout activity data. Advertisement 302 could indicate that application 112 is a video media application (e.g., movie streaming application, television show streaming application, amateur video streaming application, etc.) running on communal device 110 and that application 112 is looking for a user device to provide video media content personalization data and/or real-time user engagement activity data. Advertisement 302 could indicate that application 112 is an audio media application (e.g., music application, talk show application, etc.) running on communal device 110 and that application 112 is looking for a user device to provide audio media content personalization data and/or real-time user engagement activity data.

In some implementations, user devices (e.g., user device 130) that are near communal device 110 can reply to advertisement 302. For example, when advertisement 302 is broadcast using a short-range wireless networking technology, only user devices near enough to communal device 110 to receive the broadcast will be able to process the advertisement 302 and generate a reply 304. Thus, in some implementations, only user devices within a threshold distance (e.g., corresponding to the range of the wireless technology used to broadcast advertisement 302) will process advertisement 302 and send reply 304 to communal device 110.

To protect the privacy of the user of user device 130, user device 130 can determine whether advertisement 302 was broadcast by a known computing device. In some implementations, user device 130 can determine whether advertisement 302 was broadcast by a computing device with which user device 130 has been previously paired. For example, user device 130 can compare the device identifier of communal device 110 included in advertisement 302 to the device identifiers of previously paired devices stored in paired devices database 134. If the device identifier for communal device 110 exists within paired devices database 134, then user device 130 can determine that advertisement 302 was broadcast by a known device and that user device 130 may respond to the advertisement.

In some implementations, user device 130 can determine whether advertisement 302 was broadcast by a computing device associated with a user account that is related to the user account corresponding to user device 130. For example, related accounts database 136 can store information identifying related user accounts, including account identifiers for each related account (e.g., including the user account identifier corresponding to user device 130) and device identifiers for each device associated with the related user accounts. User device 130 can compare the device identifier of communal device 110 included in advertisement 302 to the device identifiers associated with the related user accounts stored in related accounts database 136. If the device identifier for communal device 110 exists within related accounts database 136, then user device 130 can determine that advertisement 302 was broadcast by a known device and that user device 130 may respond to the advertisement.

In some implementations, user device 130 can determine whether advertisement 302 was broadcast by an unknown computing device. For example, user device 130 can determine that communal device 110 is not a known computing device when the device identifier for communal device 110 included in advertisement 302 is not included in paired devices database 134 and not included in related accounts database 136. When user device 130 receives advertisement 302 from an unknown computing device, user device 130 can stop processing advertisement 302 and not send a reply (e.g., reply 304) in response to advertisement 302 to communal device 110. Thus, user device 130 will avoid sharing any user private or personal information, including the presence of user device 130, with an unknown (e.g., not approved, not authorized, etc.) computing device.

When user device 130 receives advertisement 302 from a known computing device, user device 130 can determine whether user device 130 can satisfy the service request identified in advertisement 302. For example, when advertisement 302 identifies that communal device 110 needs workout personalization data and/or user workout activity data, user device 130 can determine if user device 130 can provide the workout personalization data and/or user workout activity data. For example, if user device 130 is configured with the appropriate application 132, the appropriate sensors 138, the appropriate operating system, and/or appropriate other hardware or software to provide the service requested in advertisement 302, user device 130 can generate a reply 304 indicating the availability of user device 130 to satisfy the service request identified in advertisement 302. Reply 304 can, for example, include an identifier for user device 130, a user account identifier for the user account corresponding to user device 130, a user identifier (e.g., user name) for the user of user device 130, and/or information identifying the service that user device 130 can provide relevant to the service request identified in advertisement 302.

In some implementations, communal device 110 can receive reply 304 from one or more user devices. For example, since advertisement 302 was generally broadcast and not specifically sent to a single user device, communal device 110 may receive multiple replies 304 from multiple different user devices that received advertisement 302. When multiple user devices (e.g., user device 130) are located within the transmission range of the wireless networking technology used to broadcast advertisement 302, and communal device 110 is known to those devices, and those devices are capable of providing the services requested in advertisement 302, then communal device 110 may receive replies (e.g., reply 304) from each of those multiple user devices.

In some implementations, communal device 110 may determine whether the received replies were sent by known user devices. To protect communal device 110 from malicious or unauthorized computing devices, communal device 110 can determine whether reply 304 was sent by a known computing device. In some implementations, communal device 110 can determine whether advertisement 302 was broadcast by a computing device with which communal device 110 has been previously paired. For example, communal device 110 can compare the device identifier of user device 130 included in reply 304 to the device identifiers of previously paired devices stored in paired devices database 114. If the device identifier for user device 130 exists within paired devices database 114, then communal device 110 can determine that reply 304 was sent by a known device and that communal device 110 may process reply 304.

In some implementations, communal device 110 can determine whether reply 304 was sent by a computing device associated with a user account that is related to the user account corresponding to communal device 110. For example, related accounts database 116 can store information identifying related user accounts, including account identifiers for each related account (e.g., including the user account identifier corresponding to communal device 110) and device identifiers for each device associated with the related user accounts. Communal device 110 can compare the device identifier of user device 130 included in reply 304 to the device identifiers associated with the related user accounts stored in related accounts database 116. If the device identifier for user device 130 exists within related accounts database 116, then user device 130 can determine that reply 304 was sent by a known device and that communal device 110 may process reply 304 from user device 130.

In some implementations, communal device 110 can determine that reply 304 was sent by an unknown computing device. For example, user device 130 can determine that user device 130 is not a known computing device when the device identifier for user device 130 included in reply 304 is not included in paired devices database 114 and not included in related accounts database 116. When communal device 110 receives reply 304 from an unknown computing device, communal device 110 can stop processing reply 304 and prevent user device 130 and/or the user of user device 130 from participating in an activity hosted by communal device 110 until user device 130 has been authorized (e.g., through a manual pairing process, by being configured as a related account, etc.) to establish a connection with communal device 110. Thus, communal device 110 will avoid allowing an unauthorized and possibly malicious device from establishing a communication channel to communal device 110.

Figure 4:
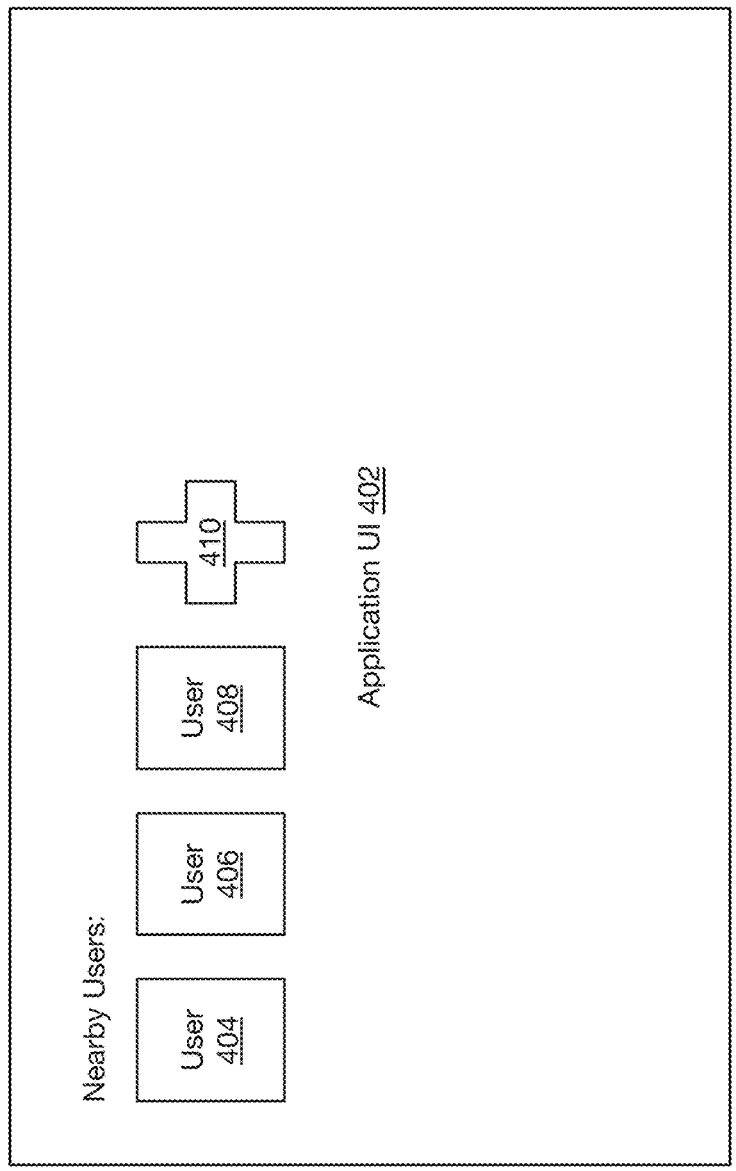
FIG. 4 is an illustration of an example graphical user interface for presenting candidate participants for an activity hosted by a communal device.

FIG. 4 is an illustration 400 of an example graphical user interface for presenting candidate participants for an activity hosted by communal device 110. For example, GUI 402 can be presented by application 112 on a display of communal device 110. For example, application 112 can present GUI 402 after being invoked by a user of communal device 110 to identify users and/or user devices that are nearby communal device 110 and capable of participating in the activity hosted by communal device 110. Application 112 may present on GUI 402 graphical objects 404-408 identifying known user devices, and/or the users thereof, that responded to advertisement 302 broadcast by communal device 110. For example, communal device 110 may store user identifiers (e.g., user names) and/or images (e.g., photographs, avatars, etc.) associated with previously paired user devices and/or related user accounts in paired devices database 114 or related accounts database 116, respectively. Communal device 110 can look up the user names and/or images associated with known user devices that responded to advertisement 302 and present the corresponding user names and/or images in lieu of user device identifiers when presenting graphical objects 404-408. A user of communal device 110 can provide user input selecting one or more of the graphical objects 404-408 to select the corresponding user (e.g., user, user device, user account, etc.) as a participant in the activity hosted by communal device 110.

In some implementations, GUI 402 may include graphical object 410 for initiating a manual pairing process with an unknown user device. For example, a user of communal device 110 can select graphical object 410 to initiate a pairing process where communal device 110 broadcasts a pairing advertisement and presents a pairing PIN or code on the display of the communal device. The unknown user device to be paired can receive the broadcast pairing advertisement and present a prompt on the display of the unknown user device that prompts the user to enter the pairing code presented by communal device 110. The user can enter the code presented by communal device 110 into the unknown user device and the unknown user device can send the code to communal device 110. If the code received by communal device 110 from the unknown user device is identical to the code presented by communal device 110, communal device 110 can cause the communal device 110 and the unknown user device to be paired. Communal device 110 can create a pairing record for the newly paired user device in paired devices database 114 and send the newly paired user device a confirmation message. Upon receipt of the confirmation message, the newly paired user device can create a new pairing record in paired devices database 134 memorializing the pairing between the newly paired user device and communal device 110.

After the manual pairing process, application 112 may present on GUI 402 a graphical object (e.g., graphical object 408) identifying the newly paired user device, and/or the user thereof. A user of communal device 110 can provide user input selecting graphical objects 408 to select the corresponding user (e.g., user, user device, user account, etc.) of the newly paired user device as a participant in the activity hosted by communal device 110.

Figure 5:
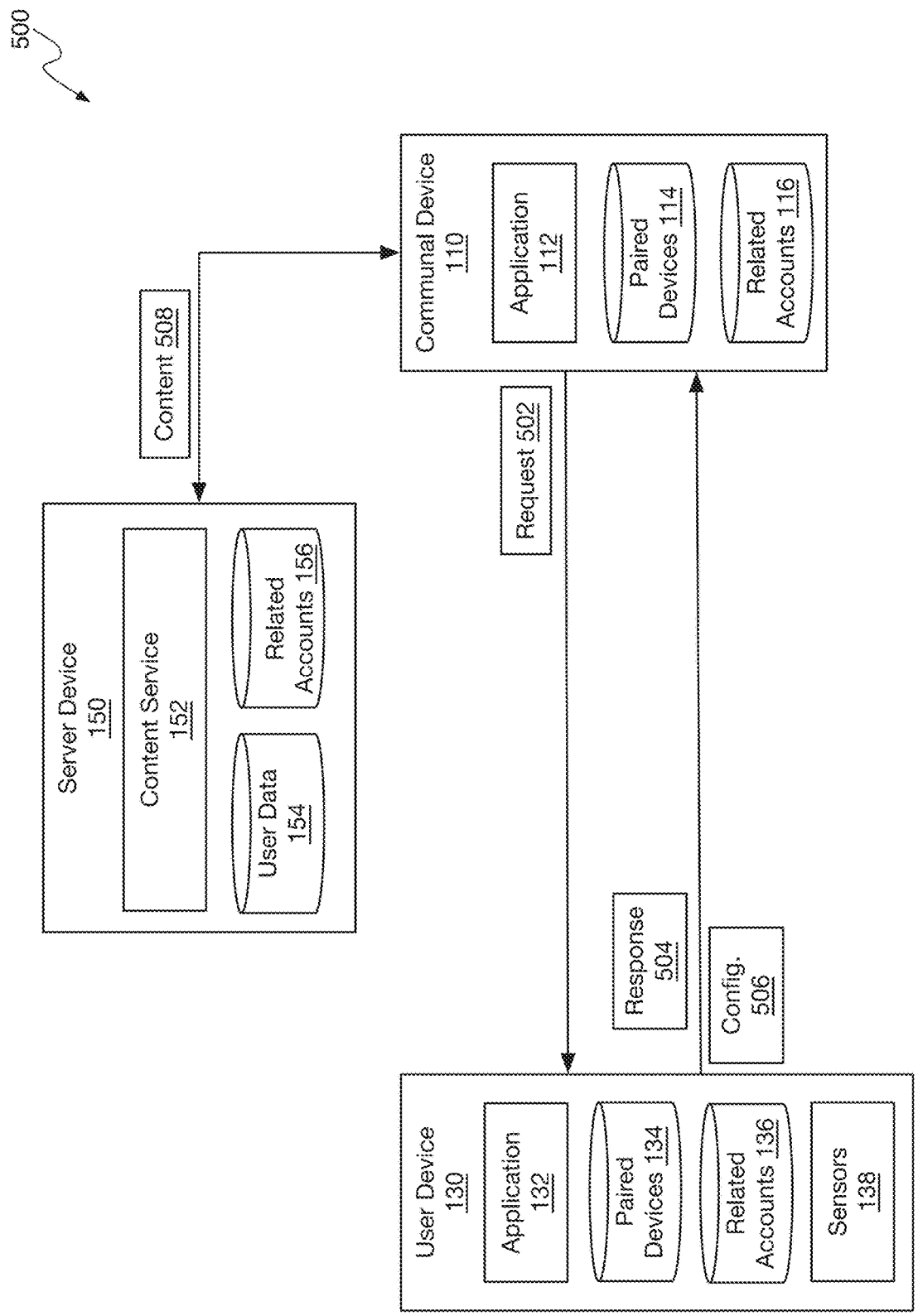
FIG. 5 is a block diagram of an example system for personalizing a communal device for nearby users.

FIG. 5 is a block diagram of an example system 500 for personalizing a communal device for nearby users. System 500 can correspond to system 100 and/or system 300 described above. In some implementations, system 500 can be configured such that communal device 110 can obtain user personalization data from nearby user devices (e.g., user device 130) so that application 112 on communal device 110 can personalize an activity (e.g., a workout, an exercise, moving watching, listening to music, etc.) hosted by communal device 110 and presented by application 112 for the users of the nearby user devices. The process of communal device 110 obtaining user personalization data from a nearby user device can be a prompted (e.g., requiring user authorization for each activity session) or unprompted (e.g., automatic, without requiring user input for each activity session) process.

In some implementations, obtaining the personalization data at communal device 110 may require a user of user device 130 to authorize the transmission of user personalization data to communal device 110. As described above, a user of communal device 110 can provide user input selecting one or more graphical objects 404-408 to select corresponding nearby user devices (e.g., user device 130), and corresponding users, for participation in an activity hosted by application 112 and/or communal device 110. In response to receiving the selection of user device 130 for participation in the activity hosted by application 112, application 112 can send request 502 to application 132 on user device 130. As described above, application 112 and application 132 can be similar, or the same, applications (e.g., but different instances, on different devices) that can be configured to have a cooperative, client/server type relationship where application 132 provides personalization data to application 112 on communal device 110 so that application 112 can personalize an activity presented by application 112 and hosted by communal device 110. Request 502 can be a request for the user of user device 130 to participate in an activity presented by application 112 and/or a request for personalization data. Request 502 can include an identifier for the application (e.g., application 112) sending the request and/or an identifier corresponding to communal device 110.

In some implementations, user device 130 can present a prompt asking the user if the user wishes to participate in the activity hosted on communal device 110. For example, when request 502 is received by application 132, application 132 may present a graphical prompt and/or an audio prompt (e.g., a verbal audio prompt) asking the user if the user wishes to participate in the activity presented by application 112.

When the user responds to the prompt and indicates that the user does not wish to participate (e.g., via manual user input, via voice input, etc.) in the activity, user device 130 can send response 504 to communal device 110 indicating that the user does not wish to participate. When the user indicates that the user does not wish to participate, user device 130 will not send any user personalization data to communal device 110 for the current activity. For a period of time (e.g., 5 minutes, 10 minutes, 1 hour, 1 day, etc.) after declining participation in an activity, user device 130 may ignore all subsequent requests 502 from application 112. However, user device 130 may process request from other applications on communal device 110 within this time period.

When the user responds to the prompt and indicates that the user does wish to participate (e.g., via manual user input, via voice input, etc.) in the activity, user device 130 can send response 504 to communal device 110 indicating that the user will participate in the activity presented by application 112. User device 130 may send personalized configuration data 506 along with response 504, or subsequent to sending response 504, so that application 112 can personalize application 112 for the user of user device 130. For example, if application 112 is a workout/exercise application (e.g., the activity hosted by communal device 110 is a workout exercise), application 132 can send personalized configuration data 506 that includes the user's workout preferences and/or user historical data related to the user's previous workout sessions. For example, the user historical data for a workout may include the types of exercises previously selected by the user, historical biometric data associated with the previous exercises, time durations associated with the exercises, etc. In some implementations, configuration data 506 can include exercise suggestions generated by application 132. For example, application 132 on user device 130 may generate exercise/workout suggestions based on the user's historical exercise data and send the exercise/workout suggestions to application 112 on communal device 110 for presentation to the user of user device 130 as part of the activity presented by application 112.

In response to receiving personalized configuration data 506, application 112 on communal device 110 may personalize the activity hosted by application 112 based on the personalized configuration data 506. For example, application 112 may personalize the graphical user interfaces presented by application 112 to present the user's name, statistics related to the user's workout history, and/or personalized workout/exercise suggestions.

In some implementations, application 112 may select and/or generate content (e.g. workouts, exercises, etc.) for presentation to the user of user device 130 based on the personalized configuration data 506 received from user device 130. For example, application 112 can send personalized configuration data 506, or portions thereof, to content service 152 on server device 150 and content service can send back content 508 that includes content item recommendations, metadata for the content item recommendations, and/or the content items for presentation by application 112. When sending personalized configuration data 506 to content service 152, application 112 can remove any personal, user identifying information so that the content request and content 508 are based on the personalized configuration data 506 without revealing the specific user corresponding to the personalized configuration data 506.

In some implementations, user device 130 can obtain content suggestions from content service 152 and include the content suggestions in personalized configuration data 506. Application 112 can present these content suggestions, as described below, and when a user of communal device 110 selects a suggested content item, or other content item, application 112 can obtain the corresponding content (e.g., content 508) from content service 152.

In some implementations, communal device 110 can obtain personalized configuration data 506 using an unprompted process. For example, the user of user device 130 may have provided user input pre-authorizing participation in particular activities hosted by communal device 110. For example, while a user may want to have the opportunity to authorize participation in each workout/ exercise session presented by communal device 110, the user may wish to automatically participate in music listening activities and/or movie watching activities when the user (e.g., user device) is near communal device 110. Thus, when application 112 corresponds to a movie application or a music application (e.g., as determined based on the application identifier in request 502), user device 130 may automatically respond to request 502 by sending response 504 indicating that the user wishes to participate in the activity presented by application 112 and automatically send personalized configuration data 506 so that application 112 can personalize the movie watching activity or music listening activity according to the user's personalized configuration data.

In some implementations, communal device 110 may receive personalized configuration data 506 from multiple user devices associated with different users. For example, when application 112 receives personalized configuration data 506 corresponding to two different users, application 112 can personalize the activity presented by application 112 based on the personalized configuration data of both users. In some implementations, application 112 may determine commonalities between the preferences identified in the personalized configuration data of both users and present content suggestions or select content items based on the users' common preferences. In some implementations, application 112 may present content suggestions representative of both users' preferences even though the content may not be preferable to one of the users. The users can then negotiate among themselves to determine which content suggestion to select.

Figure 6:
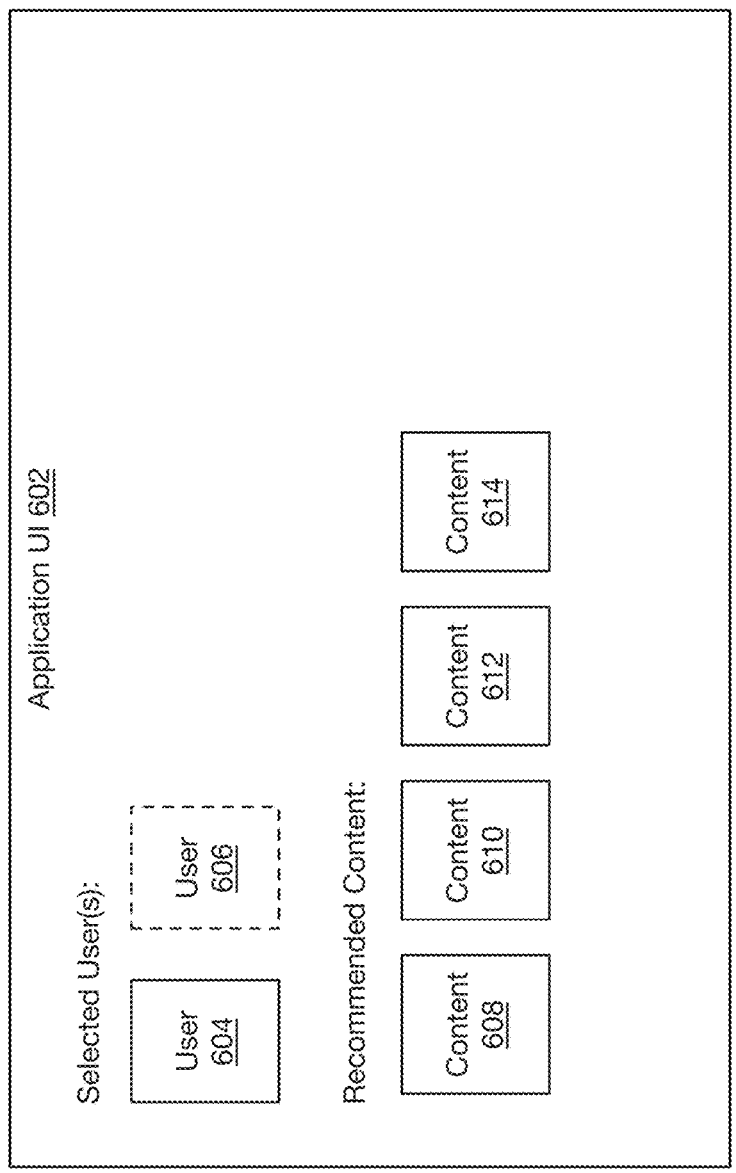
FIG. 6 is an illustration of an example graphical user interface 602 for presenting personalized content associated with an activity hosted by a communal device.

FIG. 6 is an illustration 600 of an example graphical user interface 602 for presenting personalized content associated with an activity hosted by communal device 110. For example, GUI 602 can be presented by application 112 on a display of communal device 110. GUI 602 can be presented in response to a user of user device 130 authorizing participation in an activity presented by application 112 and hosted by communal device 110.

In some implementations, GUI 602 can present graphical objects 604-606 representing users (e.g., or user devices) who have been selected for participation in the activity provided by application 112 and/or hosted by communal device 110. Graphical objects 604-606 can present user names, user images, etc., to identify the selected users. Graphical object 604 can have an appearance (e.g., solid outline, opaque color, etc.) indicating that the user corresponding to graphical object 604 has agreed to participate in the activity provided by application 112. Graphical object 606 can have an appearance (e.g., dashed outline, semi-transparent color, subdued color, etc.) different than graphical object 604 indicating that the user corresponding to graphical object 604 has been selected to participate in the activity provided by application 112 but has not yet authorized the user's device to participate in the activity.

In some implementations, GUI 602 can present recommended content for the selected user or users. As described above, one or more users can be selected for participation in the activity presented by application 112 and/or hosted by communal device 110. When a user authorizes their user device to participate in the activity, the user device (e.g., user device 130) can send personalized configuration data to communal device 110. Communal device 110 can generate and/or present content recommendations 608-614 to the participating users based on the received personalized configuration data.

In some implementations, application 112 can dynamically adjust the content recommendations based on which users are participating in the activity presented by application 112. For example, initially only the user associated with graphical object 604 may be a participant in the activity. Therefore, application 112 may generate and/or present an initial collection of content suggestions personalized for user 604. Later, the user associated with graphical object 606 may authorize (e.g., approve, agree to, etc.) participation in the activity presented by application 112. In response to receiving the personalized configuration data from user 606, application 112 may adjust the content suggestions 608-614 based on the personalized configuration data for user 604 and user 606. The content suggestions can correspond to common interests and/or preferences between user 604 and user 606 (e.g., the intersection of the data sets for user 606 and 604). The content suggestions can correspond to or represent the range of interest and/or preferences associated with user 604 and user 606 (e.g., the union of the data sets for user 606 and 604). A user of communal device 110 can select one of the content suggestions 608-614 to initiate the activity associated with the selected content item. Alternatively, the user of communal device 110 may select a content item discovered through a search, browse, or other content discovery feature of application 112.

In some implementations, communal device may not have a corresponding display device and application 112 may not present GUI 602. For example, when communal device 110 is a smart speaker that does not have a display, communal device 110 can present audio suggestions (e.g., verbal descriptions of suggested content) and receive from a user of communal device 110 voice input selecting one of the suggested content items. Alternatively, communal device 110 may automatically select a suggested content item and automatically initiate presentation present the selected content item in response to receiving personalized configuration data from a user device. As with GUI 602, communal device 110 may generate content item suggestions and/or select content for presentation based on personalized configuration data received from one or more user devices and/or associated with one or more different users.

Figure 7:
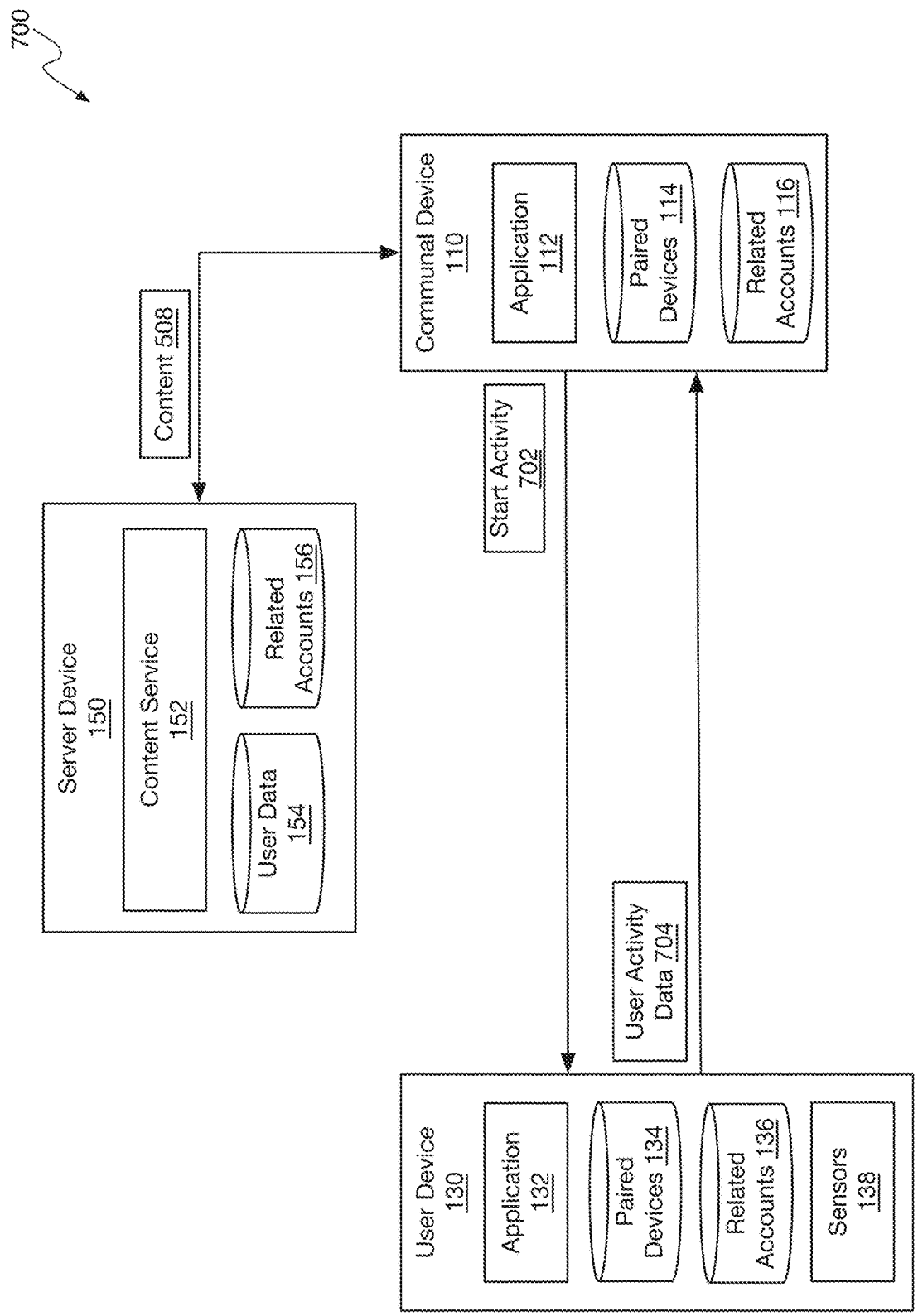
FIG. 7 is a block diagram of an example system for monitoring a user's participation in an activity hosted by a communal device.

FIG. 7 is a block diagram of an example system 700 for monitoring a user's participation in an activity hosted by communal device 110. For example, system 700 can correspond to system 100, system 300, and/or system 500 described above. System 700 can be configured to monitor a user's participation and/or engagement in an activity presented by application 112 on communal device 110 by obtaining user activity data from the user's personal computing device (e.g., user device 130). For example, user device 130 can generate user activity data based on sensor data, user input to user device 130, and/or other user interactions with user device 130.

In some implementations, a user of communal device 110 can select a content item from GUI 602 to initiate an activity provided by application 112 hosted on communal device 110. For example, the user (e.g., a participant in the activity, the user of user device 130, etc.) can select graphical object 608 representing a particular content item to initiate an activity corresponding to the content item. Communal device 110 can download or stream the selected content item (e.g., content 508) from content service 152 on server device 150, as described above. For example, the content item can be a workout video, a movie, music, etc. When the user selects graphical object 608, application 112 can initiate presentation of the workout video, movie, music, etc., and the user can engage in the activity of working out, watching a movie, listening to music, etc.

In response to receiving the selection of the content item from GUI 602, communal device can send a message 702 to application 132 on user device 130 indicating that the selected activity has begun. Start activity message 702 can include an identifier for application 112 and/or an identifier for the selected content item.

Upon receipt of message 702, application 132 can begin monitoring the activity of the user of user device 130 to generate user activity data relevant to the activity presented by application 112. For example, when the activity is workout or physical exercise, application 132 can use sensors 138 to collect biometric data related to the user's engagement in the workout. For example, application 132 can collect heartrate information from a heartbeat sensor of user device 130. Application 132 can determine step counts and/or whether the user is running, walking, jumping or performing some other movement based on motion data generated by a motion sensor on user device 130. Application 132 can determine that the user has disengaged from the activity based on the user's interactions with other applications on user device 130, the user's movement away from communal device 110 (e.g., user device 130 has moved out of wireless range of communal device 110), and/or based on sensor data indicating that the user has stopped participating in the activity presented by application 112.

While selected content item is presented (e.g., while the activity presented by application 112 continues), user device 130 can send user activity data 704 to application 112 on communal device 110. The user activity data 704 can include the sensor data (e.g., derivatives or classifications thereof) collected or generated by user device 130, as described herein. Communal device 110 can receive user activity data 704 and adjust the presentation of the selected content item based on the data included in user activity data 704. For example, while presenting a workout video (e.g., the selected content item), application 112 can present (e.g., using audio and/or video data) heartrate data, step counts, walking or running speed, or other workout related user activity data received in user activity data 704 on the display of communal device 110.

Figure 8:
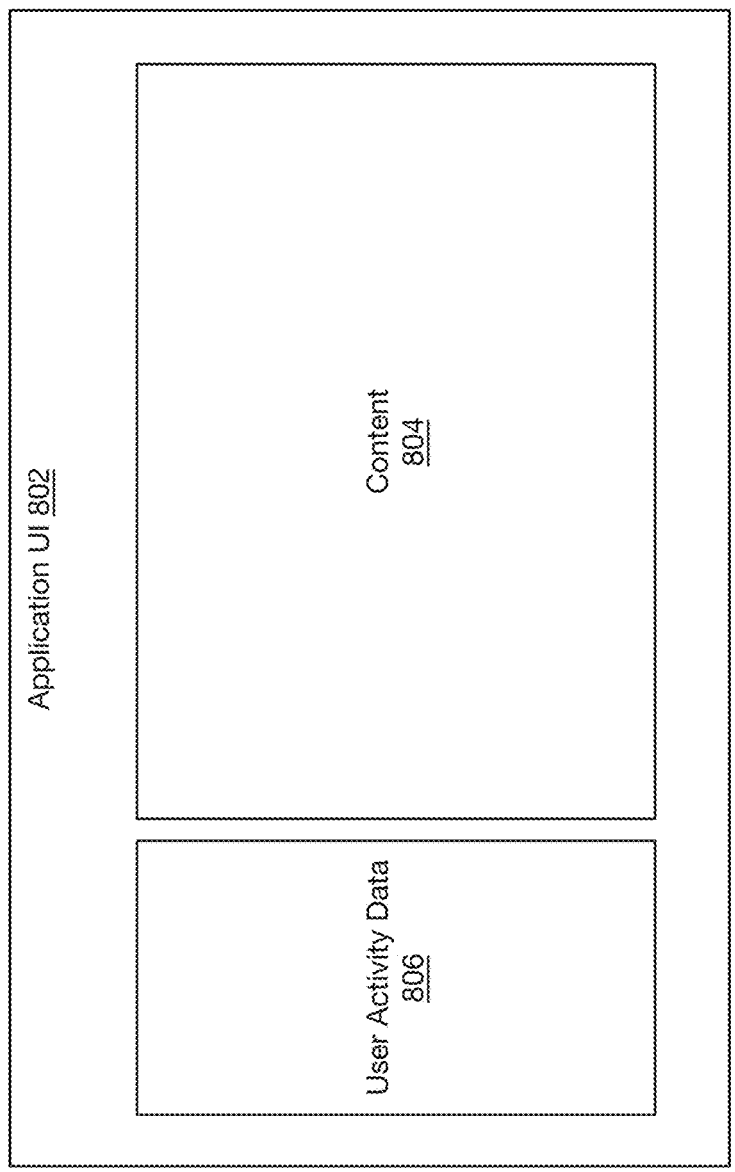
FIG. 8 is an illustration of an example graphical user interface for presenting user activity data related to a selected activity.

FIG. 8 is an illustration 800 of an example graphical user interface 802 for presenting user activity data related to a selected activity. For example, GUI 802 can be presented by application 112 on a display of communal device 110 while application 112 is presenting an activity (e.g., a workout video, a movie, music, etc.) selected by a user of communal device 110.

In some implementations, GUI 802 can include content area 804. For example, content area 804 can be an area of GUI 802 where the video portion of the content selected by the user of communal device 110 is presented. The audio portion of the content may be presented using speakers connected to communal device 110.

While communal device 110 is presenting the selected content in content area 804, communal device 110 (e.g., application 112) may receive user activity data from one or more user devices (e.g., user device 130). As described above, the user activity data may include data describing a user's engagement with the content being presented by application 112 on communal device 110. The activity data can include sensor data, or derivatives, or classifications, of sensor data generated by sensors of user device 130 and collected by application 132. As described above, for a workout activity, the activity data can include heartrate information, step count information, running speed, walking speed, or any other activity data relevant to the current activity. The activity data can be received from user device 130, and/or other user devices, in real-time or near real-time so that the user can monitor their own activity, or compete with others in an activity, on the display of communal device 110. For example, in response to receiving user activity data from user device 130, application 112 can present the user activity data in area 806 on GUI 802.

In some implementations, communal device 110 may present user activity data using audio output. For example, communal device 110 may be a smart speaker that does not have a display. In this case, communal device 110 may periodically present the user activity data using verbal audio data describing the user activity data. For example, communal device 110 may periodically announce the user's heartrate, step count, or other user activity data associated with the selected workout activity.

Figure 9:
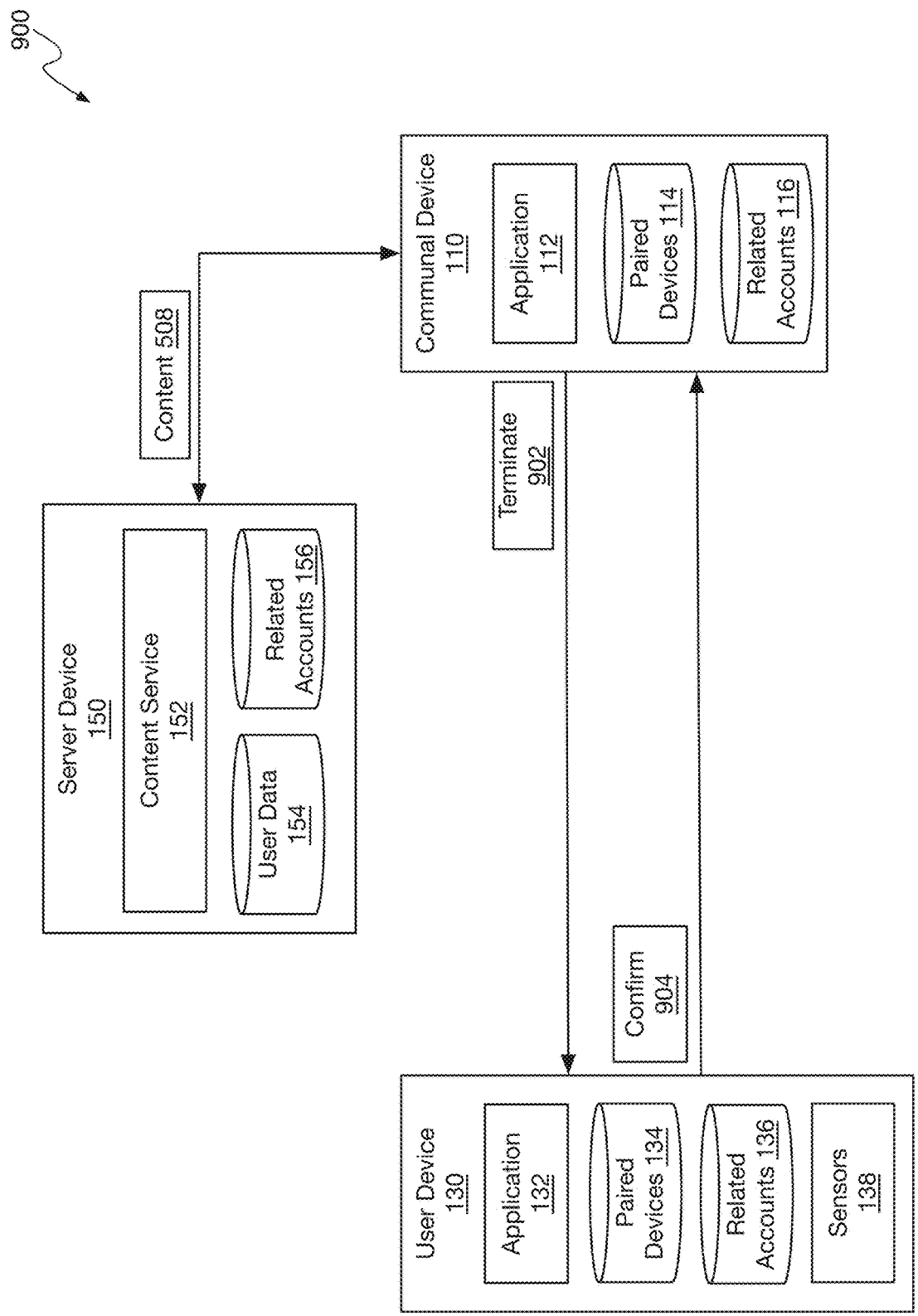
FIG. 9 is a block diagram of an example system for initiating termination of a current activity by a communal device.

FIG. 9 is a block diagram of an example system 900 for initiating termination of a current activity by communal device 110. For example, system 900 can correspond to system 100, system 300, system 500, and/or system 700, described above. In some implementations, in system 900, communal device 110 can terminate an activity presented by application 112 in response to detecting a termination event at communal device 110.

In some implementations, communal device 110 and/or application 112 can determine that the current activity hosted by communal device 110 and/or presented by application 112 should be terminated in response to detecting a termination event on communal device 110. For example, the termination event can be that the content or activity currently presented by application 112 has concluded (e.g., reached the end of the content, movie, music, workout, etc.). The termination event can be that the presentation of the content or activity was terminated (e.g., before conclusion of the activity/content) by the user through user input to communal device 110. The termination event can be that application 112 has transitioned from a foreground application to a background application. For example, application 112 may become a background application when the user has started interacting with another application on communal device 110. The termination event can be that communal device 110 has not received user activity data from user device 130 for a period of time (e.g., 1 minute, 3 minutes, 10 minutes, etc.). The termination event can be that communal device 110 has received user activity data indicating that the user is no longer engaged in the activity. For example, if the activity is a workout and the user activity data indicate that the user (e.g., user device 130) is not moving in a way that is consistent with the workout, communal device 110 may determine that the workout should be terminated.

In some implementations, in response to detecting a termination event at communal device 110, application 112 can send activity termination message 902 to the user devices (e.g., user device 130) participating in the current activity. Termination message 902 can include information identifying application 112, the activity and/or content presented by application 112, and an identification of the detected termination event.

Upon receipt of termination message 902, user device 130 can terminate its participation in the current activity. For example, upon receiving termination message 902, user device 130 can present a graphical notification informing the user of user device 130 that the current activity presented by application 112 is being terminated and indicate the reason for terminating the activity. For example, user device 130 (or application 132) can determine the reason for termination of the activity based on the termination event identifier in terminate message 902 and present a notification describing the termination event. In some implementations, the graphical notification may provide an option for the user to resume the activity on communal device 110. In some implementations, the user may dismiss the graphical notification to cause the activity to be terminated. In either case, user device 130 (e.g., application 132) can send a confirmation message 904 indicating either that the activity should be resumed or that the activity should be terminated. Upon receipt of the confirmation message 904, application 112 can resume or terminate the activity (e.g., presentation of content), as indicated in the confirmation message 904.

Figure 10:
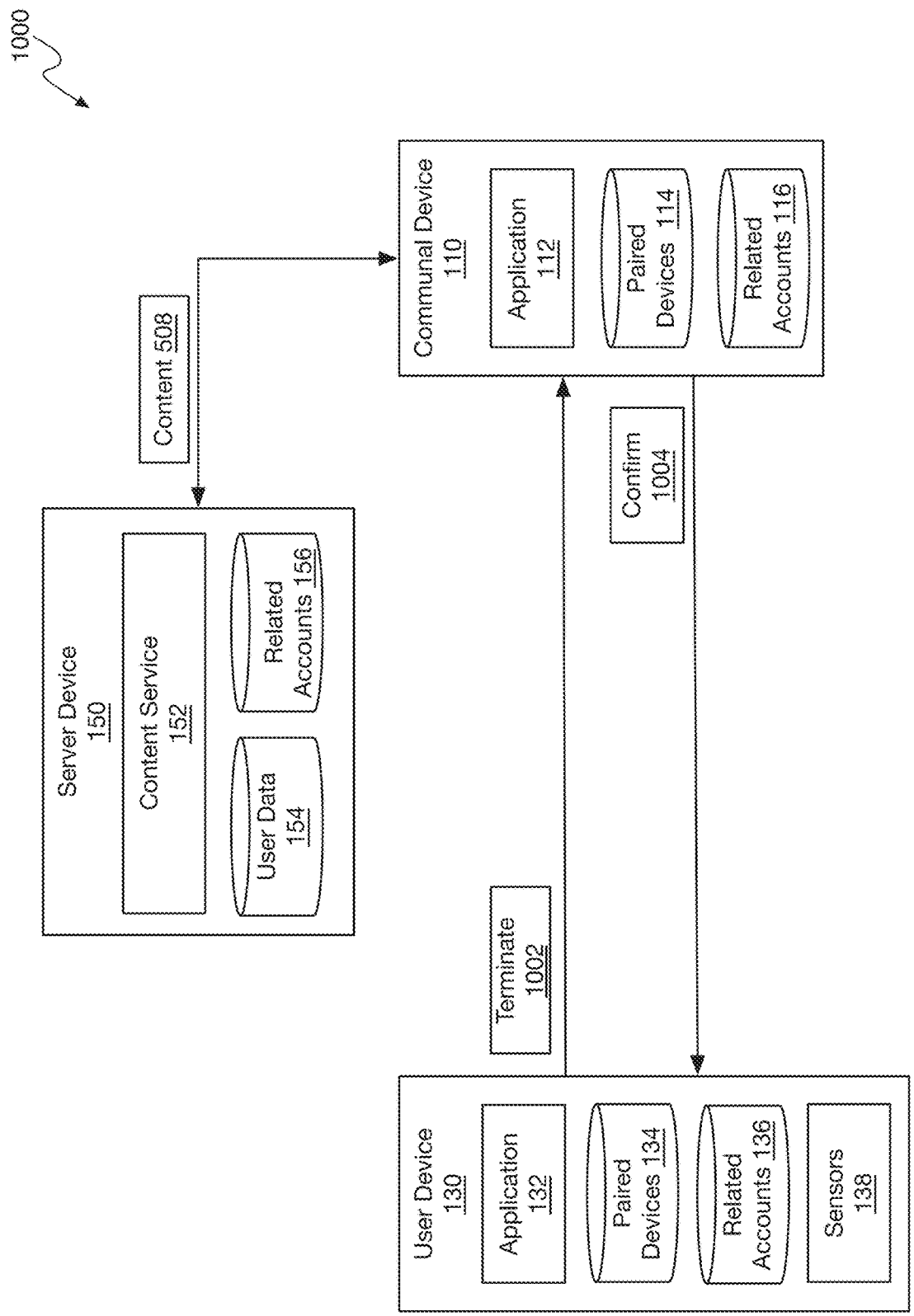
FIG. 10 is a block diagram of an example system for initiating termination of a current activity by a user device.

FIG. 10 is a block diagram of an example system 1000 for initiating termination of a current activity by user device 130. For example, system 1000 can correspond to system 100, system 300, system 500, system 700 and/or system 900, described above. In some implementations, in system 1000, user device 130 can terminate an activity presented by application 112, and in which user device 130 is participating, in response to detecting a termination event at user device 130.

In some implementations, user device 130 and/or application 132 can determine that the current activity in which user device 130 is participating and that is hosted by communal device 110 and/or presented by application 112 should be terminated in response to detecting a termination event on user device 130. For example, the termination event can be that user device 130 has collected user activity data indicating that the user is no longer engaged in the activity. For example, if the activity is a workout and the user activity data indicate that the user of user device 130 is not moving in a way that is consistent with the workout, user device 130 may determine that the workout should be terminated. The termination event can be that the user has provided input to user device 130 indicating that the user wishes to terminate the activity hosted by communal device 110. The termination event can be that the user has left environment in which communal device 110 is located. For example, the termination event can be that the user has moved beyond a threshold distance away from the location of communal device 110. The termination event can be that user device 130 has been moved beyond the range of the wireless networking technology connecting user device 130 and communal device 110. The termination event can be that user device 130 has detected that the user has been using another application (e.g., other than application 132) on user device 130 for more than a threshold period of time.

In some implementations, in response to detecting a termination event at user device 130, application 132 can send activity termination message 1002 to communal device 110. Termination message 1002 can include information identifying user device 130 and indicate that user device 130 is terminating its participation in the activity hosted by communal device 110.

In response to receiving termination message 1002, application 112 on communal device 110 can terminate the current activity presented by application 112. For example, application 112 can stop the presentation of the content associated with the activity. Application 112 can send confirmation message 1004 to application 132 on user device 130 confirming the termination of the activity.

In some implementations, detection of a termination event by user device 130 or communal device 110 may result in termination of the current activity. For example, if there is only one participant (e.g., the user of user device 130) in the activity, then detection of a termination event by either device will cause the current activity to be terminated and monitoring of user activity to cease. However, when there are multiple participants (e.g., multiple users, multiple user devices, etc.) associated with an activity, the activity may continue if at least one of the participants is still engaged in the activity. For example, detection of a termination event associated with a particular user device may cause termination of the participation of that particular user device while allowing other user devices that are still engaged in the activity to continue the activity.

In some implementations, communal device 110 can delete user personalization data upon termination of an activity. For example, communal device 110 can delete user personalization data, including personalized configuration data and user activity data, received from a participating user device when an activity in which the user device is participating is terminated on communal device 110. Thus, communal device 110 can be temporarily personalized for the user of user device 130 while minimizing the risk of exposing personal information of the user of user device 130.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above and/or below may be combined with the process steps described below to get a more complete and comprehensive understanding of these processes and the technologies disclosed herein.

Figure 11:
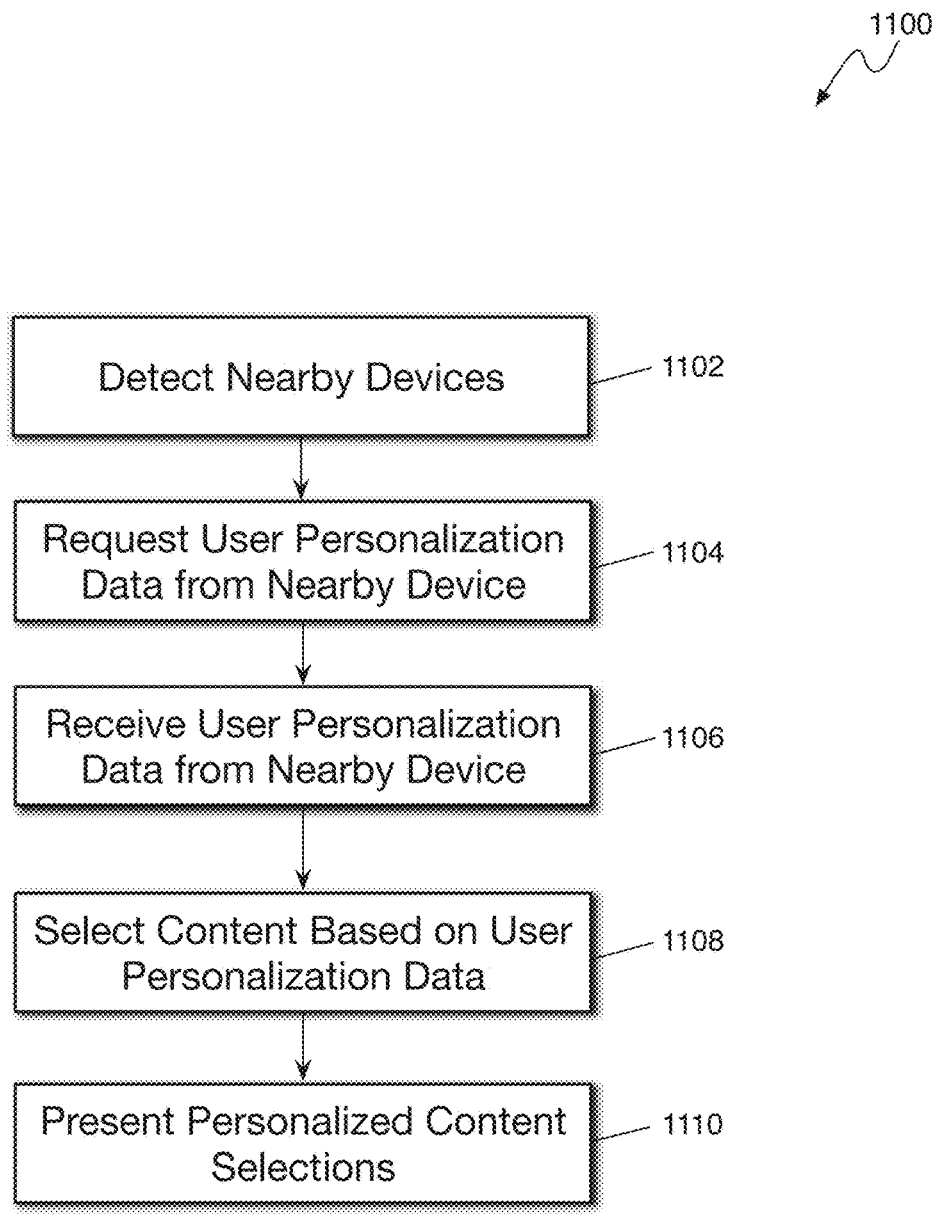
FIG. 11 is flow diagram of an example process for proximity-based personalization of content selections.

FIG. 11 is flow diagram of an example process 1100 for proximity-based personalization of content selections. For example, process 1100 can be performed by communal device 110 to perform personalized selection of content for users (e.g., user devices) near communal device 110. The nearby location of the user, or users, nearby (e.g., proximate to) communal device 110 can be used as an indication that these users are more likely to be involved in an activity hosted by communal device 110. Therefore, communal device 110 may take the nearby user's personalization data into consideration when hosting an activity and/or selecting content to present.

At step 1102, communal device 110 can detect nearby user devices. For example, in response to a user initiating an activity on communal device 110, communal device 110 may automatically detect known user devices within a threshold distance of communal device 110. This threshold distance may correspond to the transmission range of the wireless network technology used to broadcast the advertisement used to discover nearby user devices. Communal device 110 may detect, or discover, nearby user devices when the nearby user devices respond to the advertisement, as described above with reference to FIG. 3

At step 1104, communal device 110 can request user personalization data from the detected nearby user devices. For example, communal device 110 can request personalization data for the activity from a nearby user device (e.g., user device 130), or user devices, in response to user input selecting a user to participate in an activity hosted by communal device 110. Alternatively, communal device 110 can automatically (e.g., without user input) request personalization data from user device 130 in response to detecting that user device 130 is nearby.

At step 1106, communal device 110 can receive user personalization data from the nearby user device. For example, communal device 110 can receive user personalization data (e.g., personalized configuration data) for the activity from user device 130.

At step 1108, communal device 110 can select content based on the received user personalization data. For example, communal device 110 can determine user preferences, user historical behavioral data, and/or user device generated content suggestions associated with the activity based on the user personalization data. Communal device 110 can automatically select content items for the activity based on the determined user preferences, user historical behavioral data, and/or content suggestions.

At step 1110, communal device 110 can present the personalized content selections. For example, communal device 110 can automatically (e.g., without user input selecting a content item) present content items corresponding to the personalized content suggestions in response to receiving the user personalization data.

Figure 12:
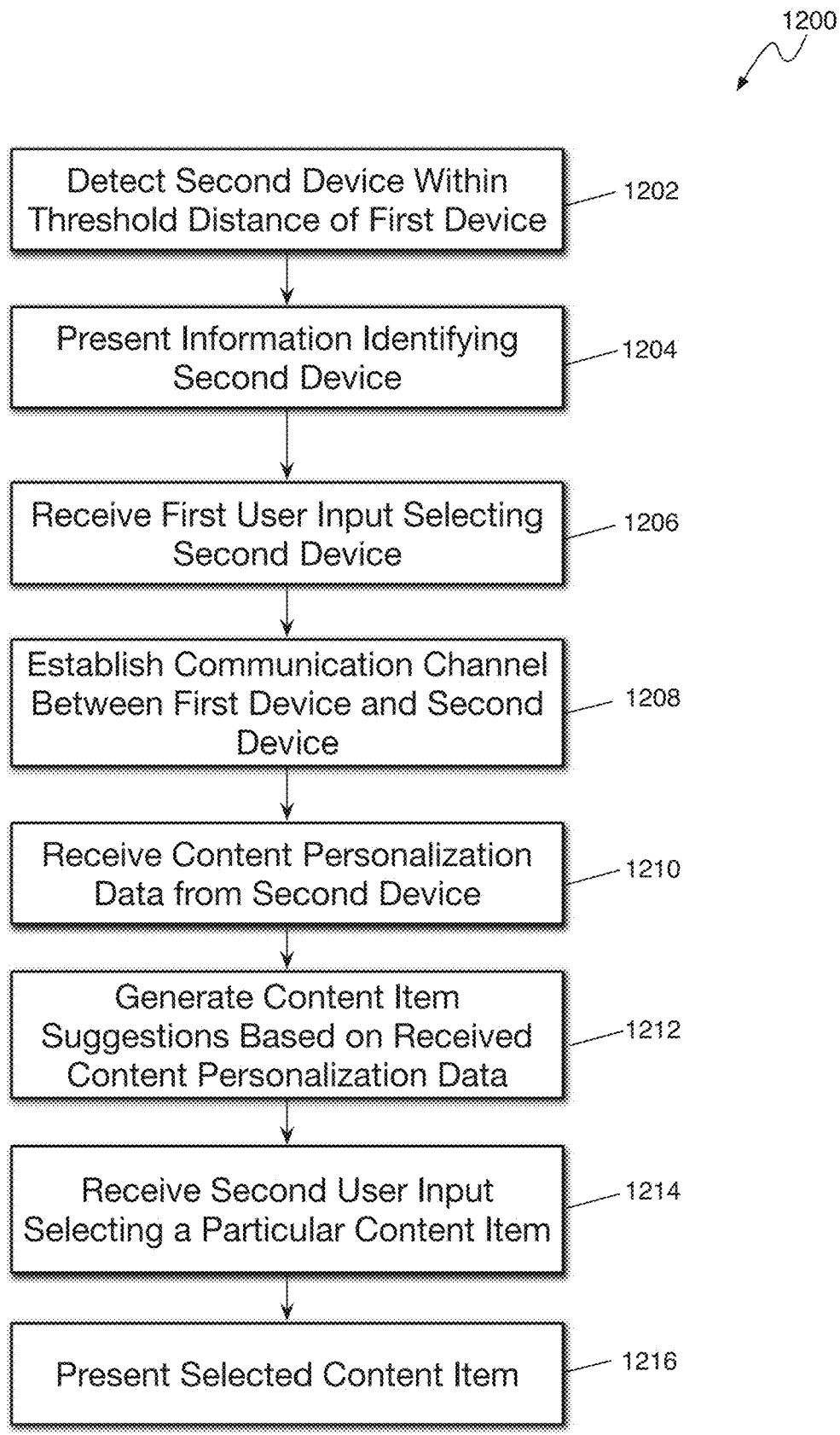
FIG. 12 is a flow diagram of an example process for personalizing a communal device corresponding to a first user account based on personalized user data received from a user device corresponding to a second user account.

FIG. 12 is a flow diagram of an example process 1200 for personalizing a communal device corresponding to a first user account based on personalized user data received from a user device corresponding to a second user account. For example, process 1200 can be performed by communal device 110 to temporarily personalize communal device 110 using personalization data from a user account that is different than the user account configured on communal device 110.

At step 1202, communal device 110 can detect user device 130 within a threshold distance of communal device 110. For example, communal device 110 can wirelessly broadcast an advertisement to discover nearby user devices (e.g., user device 130) that can provide a particular service needed by communal device 110. The service may be to provide configuration data for a particular application running on communal device 110. The service may be to provide real-time, or near-real time, user activity data for an activity hosted by communal device. A user device within a threshold distance of communal device 110 may respond to the advertisement when the user device is capable of providing the requested service.

In some implementations, communal device 110 can detect user devices that are associated with different users, or user accounts, than communal device 110. For example, communal device 110 may be configured with a default user account that is used to allow communal device 110 to access various network services. However, communal device 110 may discover user devices nearby communal device 110 that are configured with (e.g., that correspond to) user accounts that are different than the user account configured on communal device 110. Thus, communal device 110 may receive user device data and/or user personalization data associated with user accounts that are different than the default user account of communal device 110.

At step 1204, communal device 110 can present information identifying user device 130. For example, communal device 110 may receive responses to the broadcast advertisement that identify nearby user devices and/or their users. Communal device 110 can present the identification information provided by the user devices in the response to the advertisement on a display of communal device 110 and/or audibly using a speaker of communal device 110. In some contexts, communal device 110 may receive device information from trusted (e.g., known, authorized, etc.) and/or untrusted (e.g., unknown, unauthorized, etc.) user devices. However, in some implementations, communcal device 110 may only present device information associated with the trusted user devices (e.g., on participant selection GUI 402).

At step 1206, communal device 110 can receive a first user input selecting user device 130. For example, communal device 110 can receive user input selecting user device 130 and/or the user of user device 130 for participating in an activity hosted by communal device 110. The user input can be a manual user input or voice input to select user device 130, for example.

At step 1208, communal device 110 can establish a communication channel between communal device 110 and user device 130. For example, communal device 110 can send a message requesting that the selected user device 130 participate in the activity hosted by communal device 110 and that user device 130 send user activity data to communal device 110. The user of user device 130 may authorize participation in the activity, or may have pre-authorized participation in the activity, to cause user device 130 and communal device 110 to establish a communication channel between communal device 110 and user device 130 for sending from user device 130 personalized configuration data and/or real-time, or near real-time, user activity data related to the activity hosted by communal device 110 to communal device 110.

At step 1210, communal device 110 can receive content personalization data from user device 130. For example, in response to the request to participate in the activity hosted by communal device 110, user device 130 may send personalized configuration data related to the activity hosted by communal device 110 to communal device 110. The personalized configuration data can include user preferences related to the activity, user historical activity data related to the activity, content suggestions related to the activity, and/or other activity related personalization data.

At step 1212, communal device 110 can generate content item suggestions based on the received content personalization data. For example, communal device 110 can determine content items related to the activity based on the user preferences, historical activity data, and/or content suggestions included in the content personalization data. Communal device 110 can present the content suggestions on a display of communal device 110 or audibly using verbal output through a speaker of communal device 110.

At step 1214, communal device 110 can receive a second user input selecting a particular content item. For example, communal device 110 can receive manual input or voice input selecting a particular content item. The content item can be one of the suggested content items. The content item can be a content item discovered by the user by searching, browsing, or otherwise navigating through content items provided or presented by communal device 110.

At step 1216, communal device 110 can present the selected content item. For example, communal device 110 can present the selected content item using the audio and/or video output features (e.g., speaker and/or display) of communal device 110.

Figure 13:
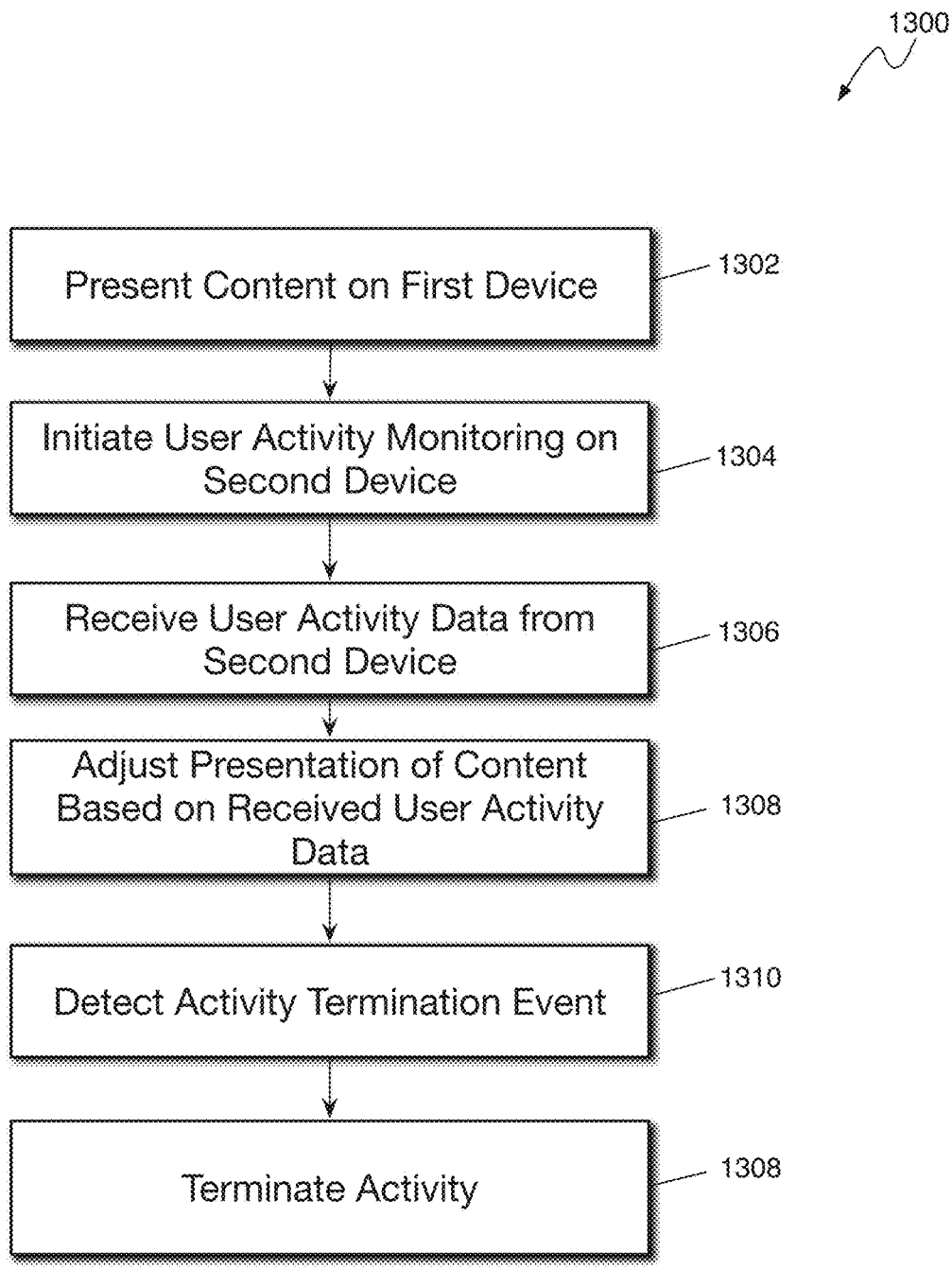
FIG. 13 is a flow diagram of an example process for monitoring a user engagement in an activity hosted by a communal device.

FIG. 13 is a flow diagram of an example process 1300 for monitoring a user engagement in an activity hosted by communal device 110. For example, process 1300 can be performed by communal device 110 to monitor a user's, or multiple users', engagement in an activity hosted by communal device 110 and/or presented by application 112.

At step 1302, communal device 110 can present content on a display of communal device 110. For example, communal device 110 can present content related to an activity hosted by communal device 110 and/or selected by a user of communal device 110, who may also be a user of user device 130, as described above with reference to process 1200.

At step 1304, communal device 110 can initiate user activity monitoring on user device 130. For example, in response to receiving user input selecting content for presentation and/or when initiating the presentation of the selected content related to an activity hosted by communal device 110, communal device 110 may send a message to a user device (e.g., user device 130) participating in the activity to cause user device 130 to initiate user activity monitoring on user device 130.

At step 1306, communal device 110 can receive user activity data from user device 130. For example, the user activity data can include sensor data, data describing a user's interactions with user device 130, and/or other user behavioral data, movement data, etc., that may be used to determine the user's engagement with the activity hosted by communal device 110.

At step 1308, communal device 110 can adjust the presentation of the content based on the received user activity data. In some implementations, communal device 110 can present user activity data describing the user's participation in the activity hosted by communal device 110. For example, when presenting a workout or exercise activity, communal device 110 can receive user activity data describing the user's heartrate, step count, running or walking speed, or other data related to the user's participation in the workout activity.

At step 1310, communal device 110 can detect an activity termination event. For example, an activity termination event can be the user closing the activity presenting application (e.g., application 112) on communal device 110. An activity termination event can be the user backgrounding (e.g., interacting with another application in the foreground) the activity presenting application (e.g., application 112) on communal device 110. An activity termination event can be the user providing input to terminate the presentation of a content item associated with the activity on communal device 110. In some implementations, the user activity data can be used by communal device 110 to detect an activity termination event. For example, if the user activity data indicates that the user is not participating in the activity hosted by communal device 110 (e.g., the user is not moving during an exercise activity), then communal device 110 may terminate the activity hosted by user device 110. An activity termination event can be the user device 130 moving more than a threshold distance (e.g., out of wireless range) of communal device 110. An activity termination event can be the receipt of an activity termination message from a participating user device (e.g., user device 130).

At step 1308, communal device 110 can terminate the activity hosted by communal device 110. For example, communal device 110 can detect a termination event, as described above, and send a message to user device 130 indicating that user device 130 should stop monitoring user activity on user device 130 and stop sending user activity data to communal device 110. Upon termination of the activity, communal device 110 can delete the user personalization data (e.g., personalized configuration data, user activity data, etc.) received from user device 130.

Figure 14:
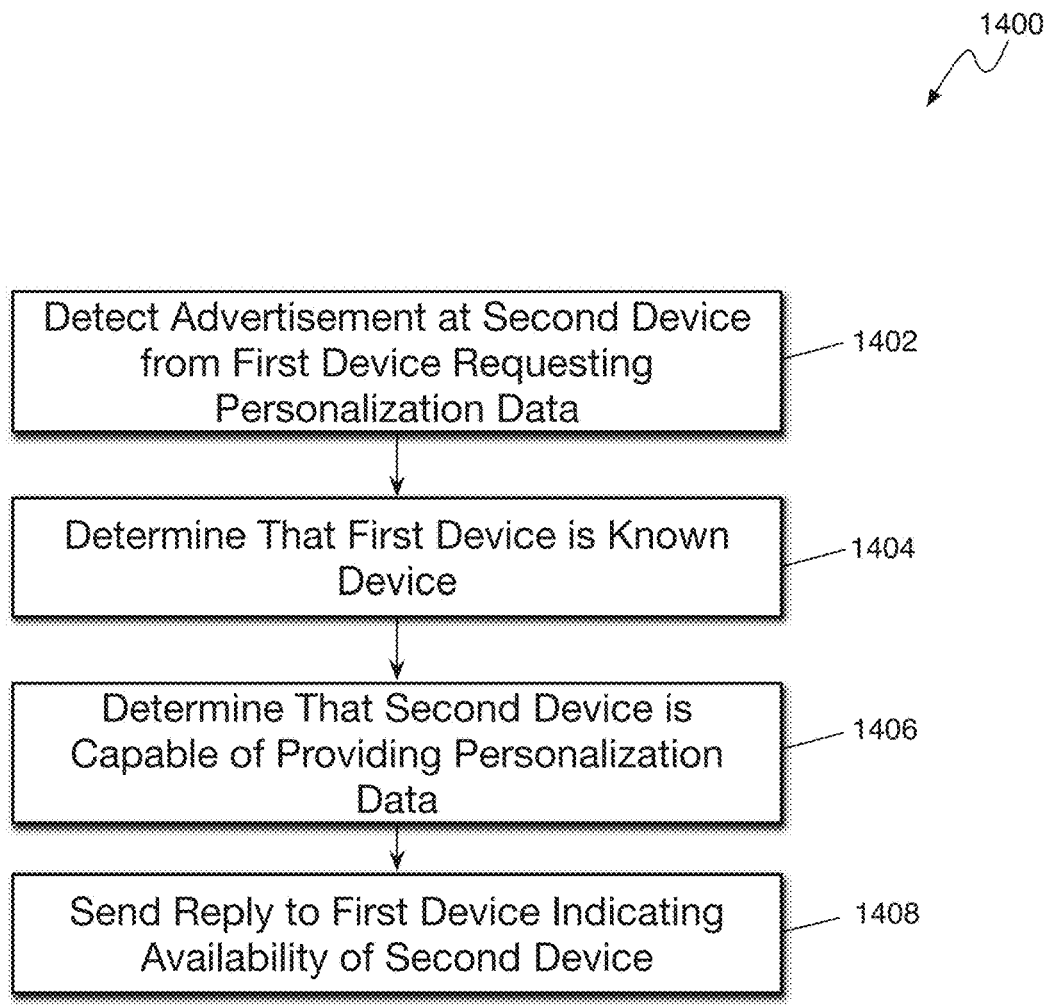
FIG. 14 is a flow diagram of an example process for determining when a user device is available for participation in an activity hosted by a communal device.

FIG. 14 is a flow diagram of an example process 1400 for determining when a user device is available for participation in an activity hosted by a communal device. For example, process 1400 can be performed by user device 130 to determine when to respond to a service request advertisement broadcast by communal device 110.

At step 1402, user device 130 can detect an advertisement from a communal device requesting personalization data for an activity hosted by the communal device. For example, user device 130 can receive an advertisement broadcast from communal device 110 indicating that communal device 110 is looking for user devices capable of providing user personalization data for the activity hosted by communal device 110. The advertisement can, for example, include an identifier for communal device 110, an identifier for the application (e.g., application 112) presenting the activity, and/or other information as may be described herein.

At step 1404, user device 130 can determine that communal device 110 is a known computing device. For example, user device 130 can obtain a device identifier for communal device 110 from the advertisement received by user device 130. User device 130 can compare the device identifier for communal device 110 to device identifiers of known computing devices (e.g., previously paired device, devices associated with user accounts related to the user account of user device 130, etc.). If communal device 110 is not a known device, process 1400 can terminate at step 1404. If communal device 110 is a known device, process 1400 can continue to step 1406.

At step 1406, user device 130 can determine that communal device 110 is capable of providing personalization data for the activity hosted by communal device 110. For example, user device 130 can determine whether user device 130 has compatible applications, compatible hardware, compatible configuration, etc., to provide personalization data for the activity hosted by communal device 110. For example, user device 130 may need to have a compatible application (e.g., application 132) installed on user device 130 to be capable of communicating the appropriate user activity data to corresponding application 112 on communal device 110. If user device 130 is not capable of providing user personalization data for the activity hosted on communal device 110, process 1400 can terminate at step 1406. If user device 130 is capable of providing user personalization data for the activity hosted on communal device 110, process 1400 can continue at step 1408.

At step 1408, user device 130 can send a reply to communal device 110 indicating the availability of user device 130 to provide user personalization data. For example, the reply can include an identification of user device 130, an identification of the user of user device 130, and/or a description of the user personalization data that user device 130 is capable of providing. The reply may include personalized configuration data to be used by communal device 110 to personalize the activity for the user of user device 130.

Figure 15:
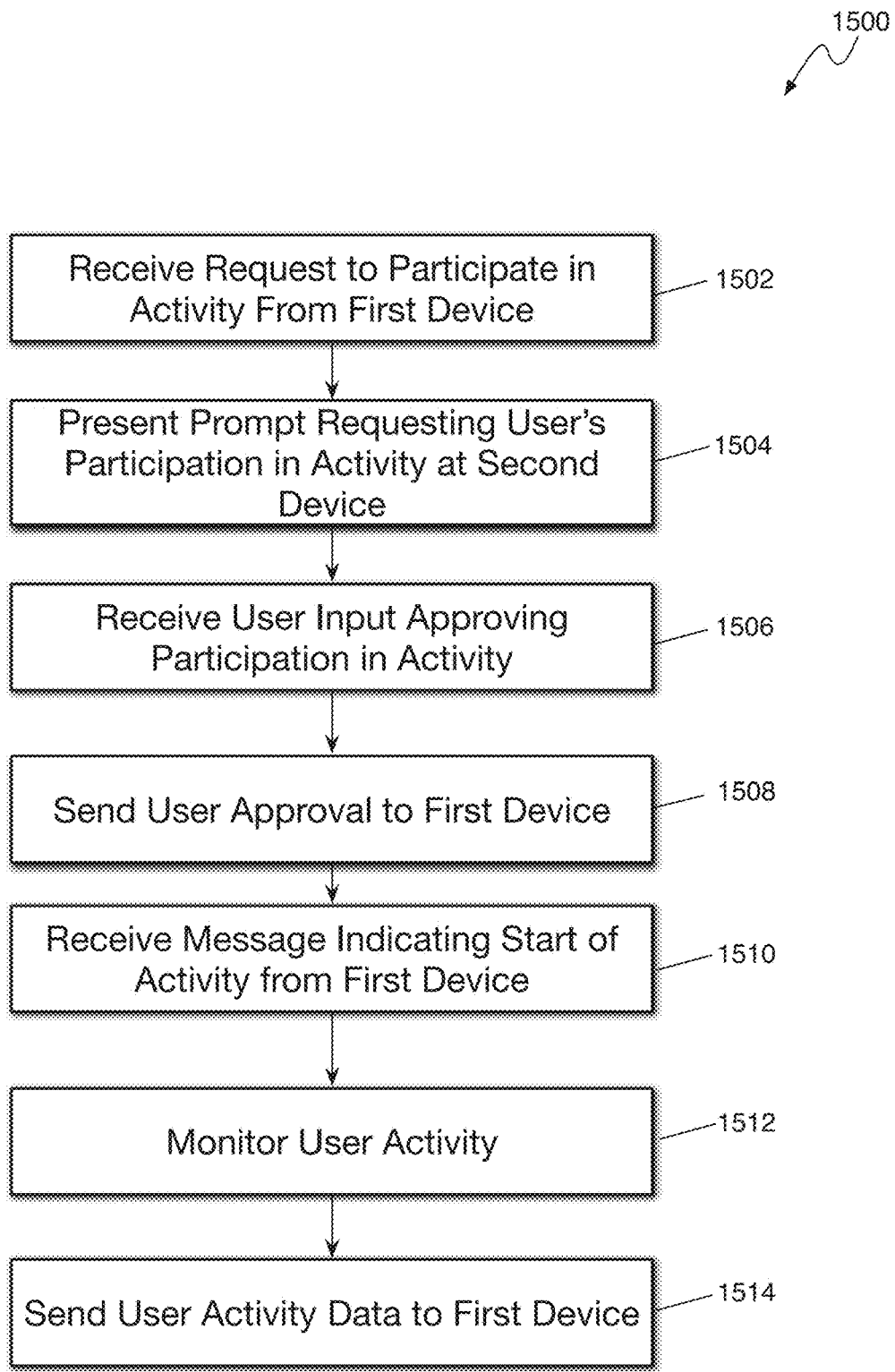
FIG. 15 is a flow diagram of an example process for monitoring a user's engagement in an activity hosted by a communal device.

FIG. 15 is a flow diagram of an example process 1500 for monitoring a user's engagement in an activity hosted by communal device 110. For example, process 1500 can be performed by user device 130 to monitor a user's engagement in an activity and provide user activity describing the user's engagement in the activity to a communal device that is hosting the activity.

In some implementations, process 1500 can be performed without user input. For example, a user of user device 130 may pre-authorize participation in a particular activity or activities hosted by a particular application on communal device 110 thereby avoiding the steps of prompting the user for authorization. Thus, in some implementations, process 1500 can be performed by user device 130 automatically and without user input.

At step 1502, user device 130 can receive a request to participate in an activity hosted by communal device 110. For example, user device 130 can receive the request when a user of communal device 110 selects user device 130 and/or the user of user device 130 to participate in an activity hosted by communal device 110. The request can include an identifier for communal device 110, an identifier of the application (e.g., application 112) presenting the activity (e.g., corresponding content), an identifier and/or description of the activity, and/or other information as may be described herein.

At step 1504, user device 130 can present a prompt requesting the user's authorization to participate in the activity identified in the received request. For example, user device 130 can determine whether communal device 110 is a known (e.g., trusted) computing device (e.g., using mechanisms described above). If communal device 110 is a known computing device, then user device 130 can present a prompt (e.g., a graphical notification, a verbal prompt, etc.) requesting the user's authorization to participate in the activity identified in the request. As described above, if the user has pre-authorized participation in the activity, user device 130 may skip steps 1504 and/or 1506.

At step 1506, user device 130 can receive user input approving participation in the activity identified in the request. For example, user device 130 can receive manual input or voice input authorizing user device 130 to participate in the activity hosted by communal device 110.

At step 1508, user device 130 can send a confirmation message indicating that user device 130 (e.g., and the user of user device 130) will participate in the activity hosted by communal device 110. For example, the confirmation message can indicate that the user device 130 will participate in the activity. The confirmation message can include user personalized configuration data so that communal device 110 can personalize the activity based on the user's personalized configuration data. Alternatively, personalized configuration data can be sent in a separate message.

At step 1510, user device 130 can receive a message from communal device 110 indicating the start of the activity hosted by communal device 110. For example, the start activity message can include an identifier for communal device 110, an identifier for the application presenting the activity on communal device 110, and/or an identifier for the activity hosted by communal device 110.

At step 1510, user device 130 can monitor user activity related to the activity hosted by communal device 110. For example, user device 130 can determine that application 132 corresponds to the application (e.g., application 112) identified in the start activity message and send a command to application 132 to begin monitoring user activity related to the activity hosted by communal device 110. Application 112 can monitor and collect user activity (e.g., movement, user input, user interactions with applications, etc.) using sensors and other hardware and software on user device 130 related to, or during the period of, the activity hosted by communal device 110.

At step 1514, user device 130 can send user activity data the communal device 110. For example, application 112 can generate user activity data based on the data collected while monitoring the user activity and send the user activity data to communal device 110.

Figure 16:
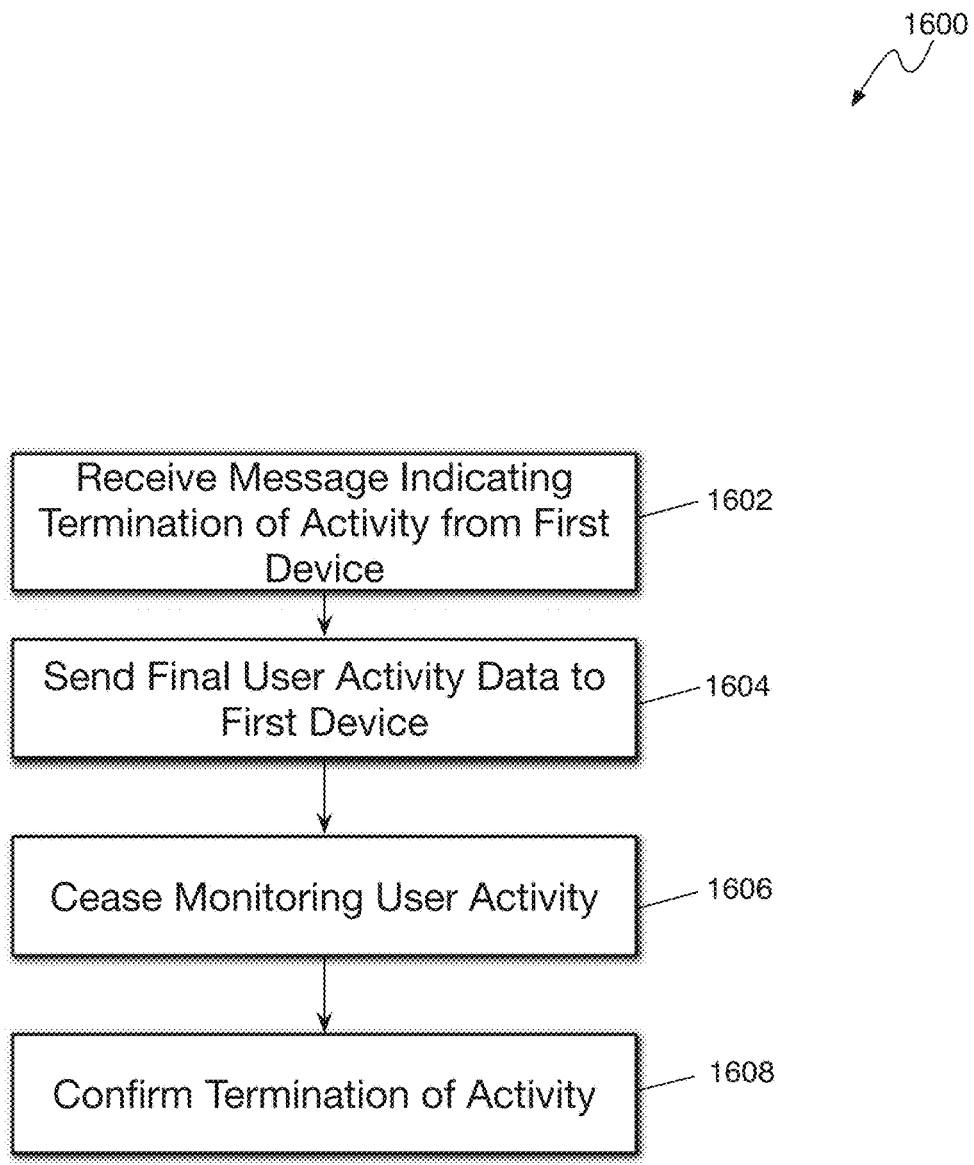
FIG. 16 is a flow diagram of an example process for terminating an activity at a user device.

FIG. 16 is a flow diagram of an example process 1600 for terminating an activity at a user device. For example, process 1600 can be performed by user device 130 in response to receiving a message indicating the termination of an activity hosted by communal device 110 in which user device 130 is a participating user device.

At step 1602, user device 130 can receive a message from communal device 110 indicating termination of an activity hosted by communal device 110. For example, when user device 130 is participating (e.g., sending personalized configuration data, sending user activity data, etc.) in the activity hosted by communal device 110 and communal device 110 detects a termination event, communal device 110 can send an activity termination message to user device 130. The termination message can include an identifier for communal device 110, an identifier for the application on communal device 110 that is presenting the activity, and/or an identifier for the activity being terminated.

At step 1604, user device 130 can send a final user activity data to communal device 110. For example, user device 110 can process the termination message received from communal device 110 to determine which activity is being terminated and which application (e.g., application 132) on user device 130 should process the termination message. In response to receiving the termination message, application 132 can generate a user activity data and send a final user activity data message to communal device 110 so that communal device 110 can present the final user activity data.

At step 1606, user device 130 can cease monitoring user activity in relation to the activity hosted by communal device 110. For example, application 132 can stop monitoring and collecting user activity data related to the activity.

At step 1608, user device 130 can send a confirmation message to communal device 110 confirming termination of the activity.

Figure 17:
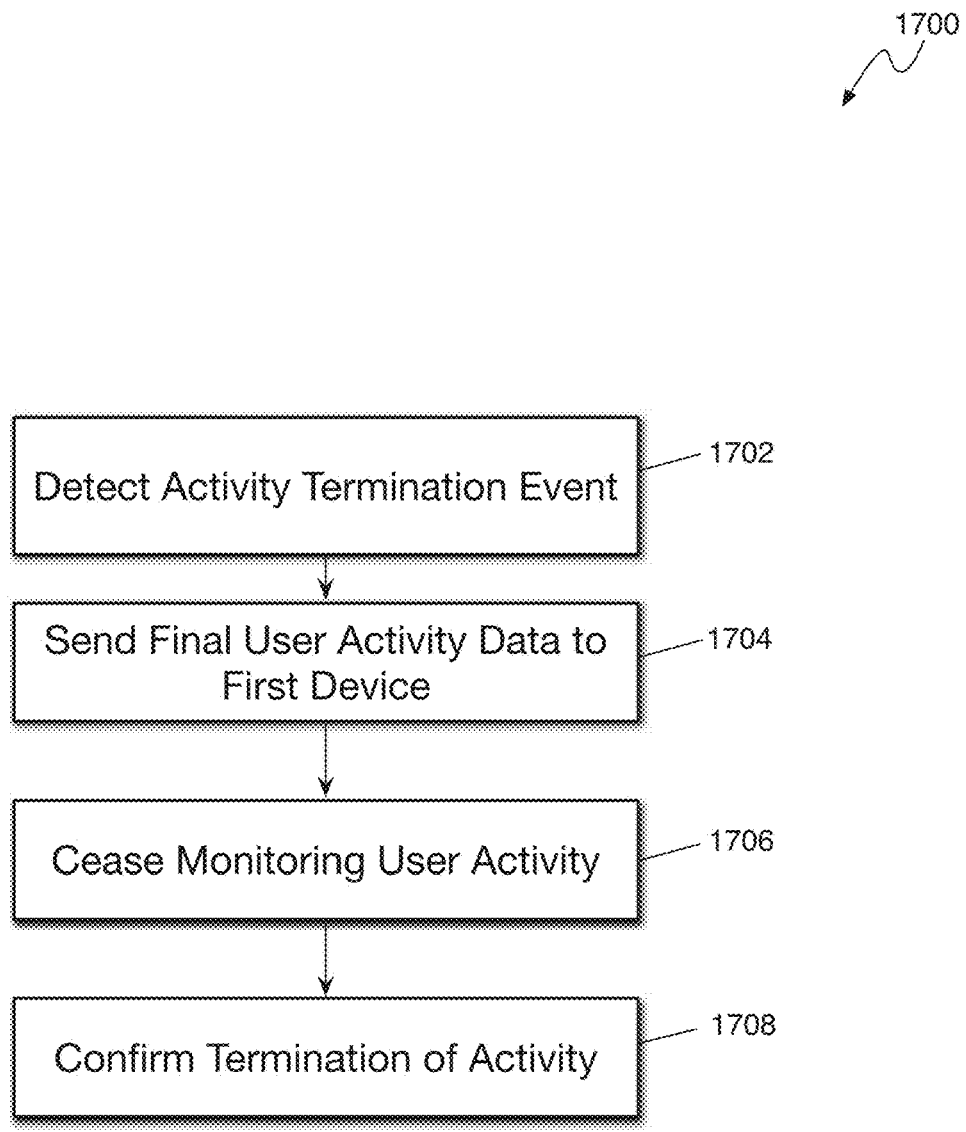
FIG. 17 is a flow diagram of an example process for initiating termination of an activity hosted by a communal device at a user device.

FIG. 17 is a flow diagram of an example process 1700 for initiating termination of an activity hosted by a communal device at a user device. For example, process 1600 can be performed by user device 130 in response to detecting a termination event at user device 130 related to an activity hosted by communal device 110 in which user device 130 is a participating user device.

At step 1702, user device 130 can detect a termination event related to an activity hosted by communal device 110. For example, the termination event can be that user device 130 has collected user activity data indicating that the user is no longer engaged in the activity. For example, if the activity is a workout and the user activity data indicate that the user of user device 130 is not moving in a way that is consistent with the workout, user device 130 may determine that the workout should be terminated. The termination event can be that the user has provided input to user device 130 indicating that the user wishes to terminate the activity hosted by communal device 110. The termination event can be that the user has left environment in which communal device 110 is located. For example, the termination event can be that the user has moved beyond a threshold distance away from the location of communal device 110. The termination event can be that user device 130 has been moved beyond the range of the wireless networking technology connecting user device 130 and communal device 110. The termination event can be that user device 130 has detected that the user has been using another application (e.g., other than application 132) on user device 130 for more than a threshold period of time.

At step 1704, user device 130 can send a final user activity data to communal device 110. For example, user device 110 can process the termination message received from communal device 110 to determine which activity is being terminated and which application (e.g., application 132) on user device 130 should process the termination message. In response to receiving the termination message, application 132 can generate a user activity data and send a final user activity data message to communal device 110 so that communal device 110 can present the final user activity data.

At step 1706, user device 130 can cease monitoring user activity in relation to the activity hosted by communal device 110. For example, application 132 can stop monitoring and collecting user activity data related to the activity.

At step 1708, user device 130 can send a confirmation message to communal device 110 confirming termination of the activity.

Example Use Cases

In some implementations, the systems described above can be configured to support several different use cases. For example, communal device 110 may host workout/exercise activities, movie watching activities, music listening activities, and/or video game activities, among other activities. Each one of these use cases is briefly described in the following paragraphs.

In some implementations, the systems described above can be configured to present or host a workout activity. For example, communal device 110 can be configured with a workout application (e.g., application 112). When a user invokes the workout application on communal device 110, the workout application can initiate a discovery process to detect nearby personal user devices (e.g., smartwatch) that are compatible with the workout application or workout activity presented by the workout application. A personal user device can be compatible when the user device has an instance or version of the workout application installed on the personal user device, for example. A personal user device can be compatible when the user device has hardware and/or software installed on the personal user device that can provide the user activity data needed or requested to support the workout activity.

When communal device 110 detects nearby, compatible user devices, communal device 110 can present the user devices and/or names of users of the detected user devices (e.g., user device 130) for selection by a user of communal device 110 (e.g., the user of communal device 110 may be the same or different than the user of the detected user device. The user of communal device 110 can select a user device and/or user for participation (e.g., the user can select the user's own device) in the workout activity. The communal device 110 can communicate with the user's personal device to obtain personalization data that can be used to personalize the workout activity for the user. The communal device 110 can provide feedback to the user related to the workout activity based on user activity data received from the user's personal device during the workout activity. The communal device 110 can intelligently terminate the workout activity when the user's activity data indicates that the user is no longer engaged in the workout activity, as described above.

In some implementations, the systems described above can be configured to present or host a video watching activity. For example, communal device 110 can be configured with a video application (e.g., application 112, a movie application, a television series application, an amateur video application, etc.). When a user invokes the video application on communal device 110, the video application can initiate a discovery process to detect nearby personal user devices (e.g., smartwatch, smartphone, etc.) that are compatible with the video application or video watching activity presented by the video application. A personal user device can be compatible when the user device has an instance or version of the video application installed on the personal user device, for example. A personal user device can be compatible when the user device has hardware and/or software installed on the personal user device that can provide the user activity data needed or requested to support the video watching activity.

When communal device 110 detects nearby, compatible user devices, communal device 110 can present the user devices and/or names of users of the detected user devices (e.g., user device 130) for selection by a user of communal device 110 (e.g., the user of communal device 110 may be the same or different than the user of the detected user device). The user of communal device 110 can select a user device and/or user for participation (e.g., the user can select the user's own device) in the movie watching activity. The communal device 110 can communicate with the user's personal device to obtain personalization data (e.g., actor preferences, genre preferences, director preferences, etc.) that can be used to personalize the movie watching activity for the user. For example, communal device 110 can use the received personalization data to provide movie recommendations personalized for an individual user or group of users who may be using, interacting with, viewing, or listening to communal device 110. The communal device 110 can intelligently terminate the movie watching activity when the user's activity data indicates that the user is no longer engaged in the movie watching activity, as described above. For example, communal device 110 and/or user device 130 can determine that the user is no longer engaged in the movie watching activity when the user interacts with another software application (e.g., phone application, messaging application, web browser application, etc.) for longer than a threshold period of time. Communal device 110 and/or user device 130 can determine that the user is no longer engaged in the movie watching activity when the user (e.g., user device) moves more than a threshold distance away from communal device 110.

In some implementations, the systems described above can be configured to present or host a music listening activity. For example, communal device 110 (e.g., a smart speaker, a set-top-box, a smart television, etc.) can be configured with a music application (e.g., application 112). When a user invokes the music application on communal device 110, the music application can initiate a discovery process to detect nearby personal user devices (e.g., smartwatch, smartphone, etc.) that are compatible with the music application or music listening activity presented by the music application. A personal user device can be compatible when the user device has an instance or version of the music application installed on the personal user device, for example. A personal user device can be compatible when the user device has hardware and/or software installed on the personal user device that can provide the user activity data needed or requested to support the music listening activity.

When communal device 110 detects nearby, compatible user devices, communal device 110 can automatically select a user device and/or user for participation in the music listening activity. For example, the user of the selected user device may have pre-authorized participating in the music listening activity. The communal device 110 can communicate with the user's personal device to obtain personalization data (e.g., musician preferences, genre preferences, year range preferences, etc.) that can be used to personalize the music listening activity for the user. In some implementations, the music listening activity can be dynamically personalized as users (e.g., user devices) enter and exit an area around the communal device 110. For example, the area around the communal device can be defined based on a configured threshold distance or defined based on the transmission range of the wireless networking technology used to communicate between the user device and communal device 110. As a user device, or user devices, enter and exit this area, the user devices can send user personalization data for their respective users to communal device 110. Communal device 110 can dynamically adjust the music selection preferences, and therefore the music selected, based on the user personalization data (e.g., personalized configuration data) received from each user device.

Communal device 110 can intelligently terminate the music listening activity when a user's activity data indicates that the user is no longer engaged in the music listening activity, as described above. For example, communal device 110 and/or user device 130 can determine that the user is no longer engaged in the music listening activity when the user interacts with another software application (e.g., phone application, messaging application, web browser application, etc.) for longer than a threshold period of time. Communal device 110 and/or user device 130 can determine that the user is no longer engaged in the music listening activity when the user (e.g., user device) moves more than a threshold distance away from communal device 110. When a termination event is detected with respect to a particular user and/or user device, communal device 110 can delete the personalization data corresponding to the particular user and/or user device. In some instances, communal device 110 can continue presenting the music listening activity for other users/user device that are nearby and adjust the music selected by communal device without considering the deleted personalization data. Thus, communal device 110 can dynamically adjust the music automatically selected by communal device 110 to suit the preferences of various and/or multiple users as they enter and exit the area around the communal device 110.

In some implementations, the systems described above can be configured to present or host a video game activity. For example, communal device 110 (e.g., a smart speaker, a set-top-box, a smart television, etc.) can be configured with a gaming application (e.g., application 112). When a user invokes the gaming application on communal device 110, the music application can initiate a discovery process to detect nearby personal user devices (e.g., smartwatch, smartphone, etc.) that are compatible with the gaming application or gaming activity presented by the gaming application. A personal user device can be compatible when the user device has an instance or version of the gaming application installed on the personal user device, for example. A personal user device can be compatible when the user device has hardware and/or software installed on the personal user device that can provide the user activity data needed or requested to support the gaming activity.

When communal device 110 detects nearby, compatible user devices, communal device 110 (e.g., application 112) can present the user devices and/or names of users of the detected user devices (e.g., user device 130) for selection by a user of communal device 110 (e.g., the user of communal device 110 may be the same or different than the user of the detected user device). The user of communal device 110 can select a user device and/or user for participation (e.g., the user can select the user's own device) in the video game activity. The communal device 110 can communicate with the user's personal device to obtain personalization data (e.g., characters, avatars, points accrued, attributes accrued to characters, levels passed, ranking, etc.) that can be used to personalize and/or configure the gaming activity for the user.

The communal device 110 can intelligently terminate the gaming activity when the user's activity data indicates that the user is no longer engaged in the gaming activity, as described above. For example, communal device 110 and/or user device 130 can determine that the user is no longer engaged in the gaming activity when the user interacts with another software application (e.g., phone application, messaging application, web browser application, etc.) for longer than a threshold period of time. Communal device 110 and/or user device 130 can determine that the user is no longer engaged in the gaming activity when the user (e.g., user device) moves more than a threshold distance away from communal device 110.

The above paragraphs describe example use cases where a communal device (e.g., set-top-box, smart television, smart speaker, etc.) and/or an activity hosted by the communal device may be temporarily personalized based on personalization data received from nearby personal user devices (e.g., smart watch, smart phone, smart glasses, etc.). Many other use cases using the proximity-based personalization of a communal device are contemplated. Therefore, the scope of this disclosure is not limited to the specific examples above.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to personalize an activity hosted by a communal device for user participants. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to temporarily personalize an activity hosted by a communal device to the preferences of a specific user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing user personalization data, personalized configuration data, and/or user activity data, the present technology can be configured to allow users to select to "opt in" or "opt out" of participation in the collection of personal information data during registration for services or anytime thereafter. In another example, users can select not participate in the activity hosted by the communal device and, therefore, prevent the user's device from sharing personal information data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected for an activity and presented to users by inferring preferences based on non-personal information data or a bare minimum amount of personal information, such as the content being requested by the device associated with a user, other non-personal information available to the communal device, or publicly available information.

Example System Architecture

Figure 18:
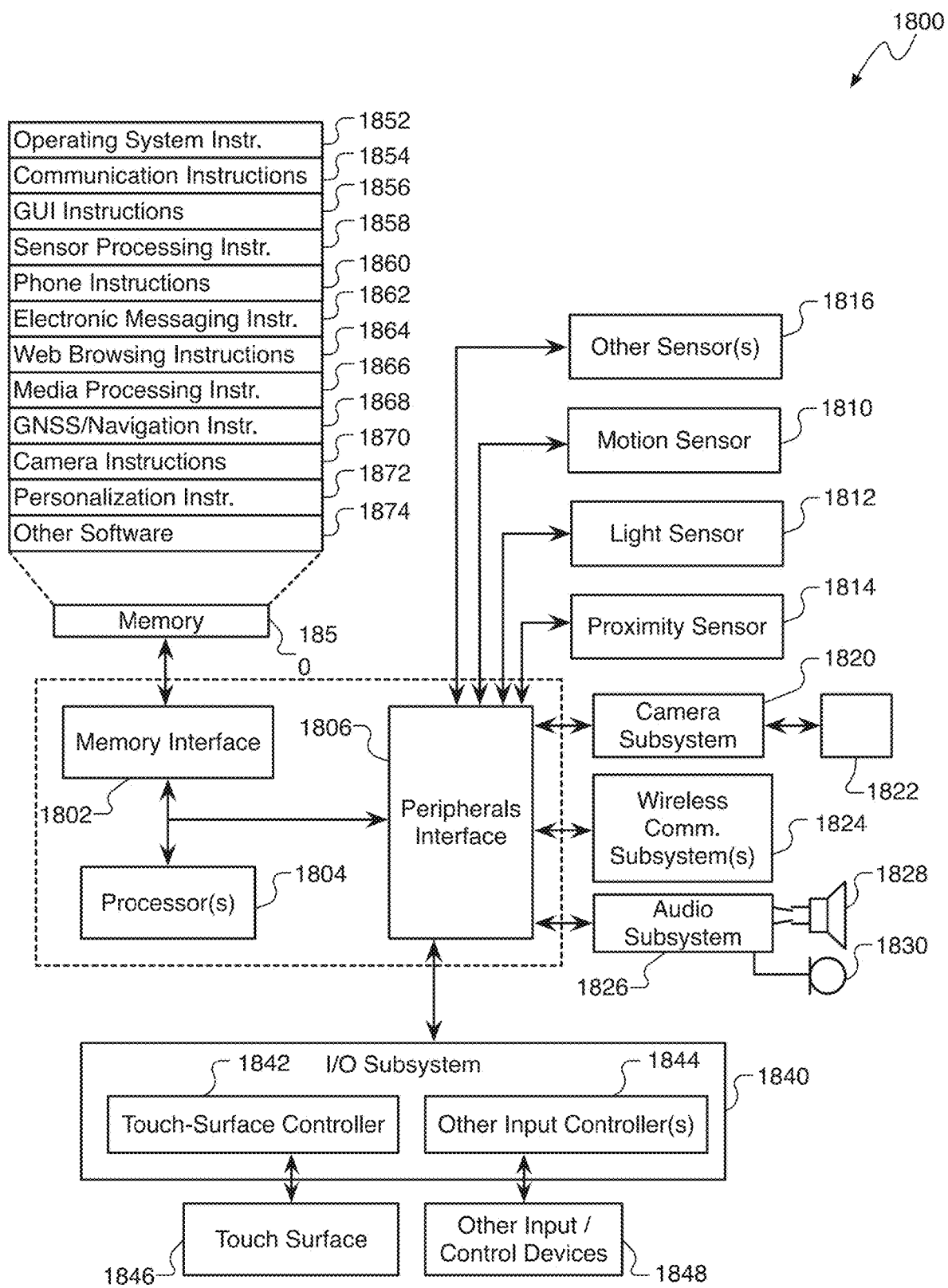
FIG. 18 is a block diagram of an example computing device that can implement the features and processes of FIGS. 1-17.

FIG. 18 is a block diagram of an example computing device 1800 that can implement the features and processes of FIGS. 1-17. The computing device 1800 can include a memory interface 1802, one or more data processors, image processors and/or central processing units 1804, and a peripherals interface 1806. The memory interface 1802, the one or more processors 1804 and/or the peripherals interface 1806 can be separate components or can be integrated in one or more integrated circuits. The various components in the computing device 1800 can be coupled by one or more communication buses or signal lines.

Sensors, devices, and subsystems can be coupled to the peripherals interface 1806 to facilitate multiple functionalities. For example, a motion sensor 1810, a light sensor 1812, and a proximity sensor 1814 can be coupled to the peripherals interface 1806 to facilitate orientation, lighting, and proximity functions. Other sensors 1816 can also be connected to the peripherals interface 1806, such as a global navigation satellite system (GNSS) (e.g., GPS receiver), a temperature sensor, a biometric sensor, magnetometer or other sensing device, to facilitate related functionalities.

A camera subsystem 1820 and an optical sensor 1822, e.g., a charged coupled device (CCD) or a complementary metal-oxide semiconductor (CMOS) optical sensor, can be utilized to facilitate camera functions, such as recording photographs and video clips. The camera subsystem 1820 and the optical sensor 1822 can be used to collect images of a user to be used during authentication of a user, e.g., by performing facial recognition analysis.

Communication functions can be facilitated through one or more wireless communication subsystems 1824, which can include radio frequency receivers and transmitters and/ or optical (e.g., infrared) receivers and transmitters. The specific design and implementation of the communication subsystem 1824 can depend on the communication network(s) over which the computing device 1800 is intended to operate. For example, the computing device 1800 can include communication subsystems 1824 designed to operate over a GSM network, a GPRS network, an EDGE network, a Wi-Fi or WiMax network, and a Bluetooth™ network. In particular, the wireless communication subsystems 1824 can include hosting protocols such that the device 100 can be configured as a base station for other wireless devices.

An audio subsystem 1826 can be coupled to a speaker 1828 and a microphone 1830 to facilitate voice-enabled functions, such as speaker recognition, voice replication, digital recording, and telephony functions. The audio subsystem 1826 can be configured to facilitate processing voice commands, voice printing and voice authentication, for example.

The I/O subsystem 1840 can include a touch-surface controller 1842 and/or other input controller(s) 1844. The touch-surface controller 1842 can be coupled to a touch surface 1846. The touch surface 1846 and touch-surface controller 1842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1846.

The other input controller(s) 1844 can be coupled to other input/control devices 1848, such as one or more buttons, rocker switches, thumbwheel, infrared port, USB port, and/or a pointer device such as a stylus. The one or more buttons (not shown) can include an up/down button for volume control of the speaker 1828 and/or the microphone 1830.

In one implementation, a pressing of the button for a first duration can disengage a lock of the touch surface 1846; and a pressing of the button for a second duration that is longer than the first duration can turn power to the computing device 1800 on or off. Pressing the button for a third duration can activate a voice control, or voice command, module that enables the user to speak commands into the microphone 1830 to cause the device to execute the spoken command. The user can customize a functionality of one or more of the buttons. The touch surface 1846 can, for example, also be used to implement virtual or soft buttons and/or a keyboard.

In some implementations, the computing device 1800 can present recorded audio and/or video files, such as MP3, AAC, and MPEG files. In some implementations, the computing device 1800 can include the functionality of an MP3 player, such as an iPod™.

The memory interface 1802 can be coupled to memory 1850. The memory 1850 can include high-speed random-access memory and/or non-volatile memory, such as one or more magnetic disk storage devices, one or more optical storage devices, and/or flash memory (e.g., NAND, NOR). The memory 1850 can store an operating system 1852, such as Darwin, RTXC, LINUX, UNIX, OS X, WINDOWS, or an embedded operating system such as VxWorks.

The operating system 1852 can include instructions for handling basic system services and for performing hardware dependent tasks. In some implementations, the operating system 1852 can be a kernel (e.g., UNIX kernel). In some implementations, the operating system 1852 can include instructions for performing proximity-based personalization of a computing device. For example, operating system 1852 can implement some or all of the activity personalization features as described with reference to FIGS. 1-17.

The memory 1850 can also store communication instructions 1854 to facilitate communicating with one or more additional devices, one or more computers and/or one or more servers. The memory 1850 can include graphical user interface instructions 1856 to facilitate graphic user interface processing; sensor processing instructions 1858 to facilitate sensor-related processing and functions; phone instructions 1860 to facilitate phone-related processes and functions; electronic messaging instructions 1862 to facilitate electronic-messaging related processes and functions; web browsing instructions 1864 to facilitate web browsing-related processes and functions; media processing instructions 1866 to facilitate media processing-related processes and functions; GNSS/Navigation instructions 1868 to facilitate GNSS and navigation-related processes and instructions; and/or camera instructions 1870 to facilitate camera-related processes and functions.

The memory 1850 can store software instructions 1872 to facilitate other processes and functions, such as the proximity-based personalization processes and functions as described with reference to FIGS. 1-17.

The memory 1850 can also store other software instructions 1874, such as web video instructions to facilitate web video-related processes and functions; and/or web shopping instructions to facilitate web shopping-related processes and functions. In some implementations, the media processing instructions 1866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1850 can include additional instructions or fewer instructions. Furthermore, various functions of the computing device 1800 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:
1. A method comprising:
  detecting, by a first user device, a second user device within a threshold distance of the first user device;
  presenting, by the first user device, information identifying the second user device, wherein the first user device is a communal user device;
  receiving, by the first user device, a first user input selecting the second user device;
  in response to receiving the first user input selecting the second user device: selecting a user account corresponding to the selected, second user device for generating personalized content for the first user device;
  receiving, by the first user device, identification credentials for accessing the user account;
  accessing, by the first user device using the identification credentials, the user account to determine historical user activity data corresponding to the user account;

presenting, by the first user device, content item suggestions based on the historical user activity data corresponding to the user account;

receiving, by the first user device, a second user input selecting a particular content item from the content item suggestions; and presenting, by the first user device, the particular content item.

2. The method of claim 1, further comprising:

obtaining, by the first user device, data identifying one or more related user accounts and devices associated with the one or more related accounts; and storing, by the first user device, the data identifying the one or more related user accounts and devices associated with the one or more related accounts.

3. The method of claim 2, wherein a communication channel is established with the second user device without requiring a manual pairing process based on the data identifying the one or more related user accounts and devices associated with the one or more related accounts.

4. The method of claim 1, further comprising accessing, by the first user device using the identification credentials, the user account to determine user preferences associated with the particular user, wherein the content item suggestions are further based on the user preferences associated with the particular user.

5. The method of claim 1, further comprising:

in response to the second user input, initiating, by the first user device, user activity monitoring on the second user device; and receiving, by the first user device, current user activity data from the second user device, the current activity data describing a current activity of the particular user corresponding to the user account.

6. The method of claim 5, further comprising:

detecting, by the first user device, a termination event associated with the selected content item; and in response to the termination event, deleting, by the first user device, the current user activity data from the first user device.

7. The method of claim 5, further comprising:

detecting, by the first user device, a termination event associated with the selected content item, wherein the termination event is detected based on the current user activity data received from the second user device; and terminating, by the first user device, the presentation of the selected content item.

8. The method of claim 5, further comprising:

detecting, by the first user device, a termination event associated with the selected content item, wherein the termination event is detected in response to a change in state of the first user device; and causing, by the first user device, the second user device to cease user activity monitoring.

9. The method of claim 1, further comprising:

detecting, by the first user device, a termination event associated with the selected content item; and in response to detecting the termination event, deleting, by the first user device, at least a portion of the historical user activity data corresponding to the user account from the first user device.

10. The method of claim 1, wherein accessing comprises submitting, by the first user device to another device, the identification credentials to gain access to the user account.

11. A system comprising:

one or more processors; and a computer readable medium including one or more sequences of instructions that, when executed by the one or more processors, causes the processors to perform operations comprising:

detecting, by a first user device, a second user device within a threshold distance of the first user device;

presenting, by the first user device, information identifying the second user device, wherein the first user device is a communal user device;

receiving, by the first user device, a first user input selecting the second user device;

in response to receiving the first user input selecting the second user device: selecting a user account corresponding to the selected, second user device for generating personalized content for the first user device;

receiving, by the first user device, identification credentials for accessing the user account;

accessing, by the first user device using the identification credentials, the user account to determine historical user activity data corresponding to the user account;

presenting, by the first user device, content item suggestions based on the historical user activity data corresponding to the user account;

receiving, by the first user device, a second user input selecting a particular content item from the content item suggestions; and presenting, by the first user device, the particular content item.

12. The system of claim 11, wherein the instructions cause the processors to perform operations comprising:

obtaining, by the first user device, data identifying one or more related user accounts and devices associated with the one or more related accounts; and storing, by the first user device, the data identifying the one or more related user accounts and devices associated with the one or more related accounts.

13. The system of claim 12, wherein a communication channel is established with the second user device without requiring a manual pairing process based on the data identifying the one or more related user accounts and devices associated with the one or more related accounts.

14. The system of claim 11, further comprising accessing, by the first user device using the identification credentials, the user account to determine user preferences associated with the particular user, wherein the content item suggestions are further based on the user preferences associated with the particular user.

15. The system of claim 11, wherein the instructions cause the processors to perform operations comprising:

in response to the second user input, initiating, by the first user device, user activity monitoring on the second user device; and receiving, by the first user device, current user activity data from the second user device, the current activity data describing a current activity of the particular user corresponding to the user account.

16. The system of claim 15, wherein the instructions cause the processors to perform operations comprising:

detecting, by the first user device, a termination event associated with the selected content item; and in response to the termination event, deleting, by the first user device, the current user activity data from the first user device.

17. The system of claim 15, wherein the instructions cause the processors to perform operations comprising:
- detecting, by the first user device, a termination event associated with the selected content item, wherein the termination event is detected based on the current user activity data received from the second user device; and
- terminating, by the first user device, the presentation of the selected content item.

18. The system of claim 15, wherein the instructions cause the processors to perform operations comprising:
- detecting, by the first user device, a termination event associated with the selected content item, wherein the termination event is detected in response to a change in state of the first user device; and
- causing, by the first user device, the second user device to cease user activity monitoring.

19. The system of claim 11, wherein the instructions cause the processors to perform operations comprising:
- detecting, by the first user device, a termination event associated with the selected content item; and
- in response to detecting the termination event, deleting, by the first user device, at least a portion of the historical user activity data corresponding to the user account from the first user device.

20. A non-transitory computer readable medium including one or more sequences of instructions that, when executed by one or more processors, cause the one or more processors to perform operations comprising:
- detecting, by a first user device, a second user device within a threshold distance of the first user device;
- presenting, by the first user device, information identifying the second user device, wherein the first user device is a communal user device;
- receiving, by the first user device, a first user input selecting the second user device;
- in response to receiving the first user input selecting the second user device: selecting a user account corresponding to the selected, second user device for generating personalized content for the first user device;
- receiving, by the first user device, identification credentials for accessing the user account;
- accessing, by the first user device using the identification credentials, the user account to determine historical user activity data corresponding to the user account;
- presenting, by the first user device, content item suggestions based on the historical user activity data corresponding to the user account;
- receiving, by the first user device, a second user input selecting a particular content item from the content suggestions; and
- presenting, by the first user device, the particular content item.

21. The non-transitory computer readable medium of claim 20, wherein the instructions cause the one or more processors to perform operations comprising:
- obtaining, by the first user device, data identifying one or more related user accounts and devices associated with the one or more related accounts; and
- storing, by the first user device, the data identifying the one or more related user accounts and devices associated with the one or more related accounts.

* * * * *